United States Patent
Onda et al.

(10) Patent No.: US 8,209,324 B2
(45) Date of Patent: Jun. 26, 2012

(54) METHOD AND SYSTEM FOR PROVIDING INFORMATION IN VIRTUAL SPACE

(75) Inventors: Yasushi Onda, Tokyo (JP); Izua Kano, Yokohama (JP); Dai Kamiya, Tokyo (JP); Keiichi Murakami, Ichikawa (JP); Eiju Yamada, Yokohama (JP); Kazuhiro Yamada, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 342 days.

(21) Appl. No.: 12/061,095

(22) Filed: Apr. 2, 2008

(65) Prior Publication Data
US 2008/0250001 A1 Oct. 9, 2008

(30) Foreign Application Priority Data
Apr. 6, 2007 (JP) ................................. 2007-101068

(51) Int. Cl.
G06F 7/00 (2006.01)
G06F 17/30 (2006.01)
(52) U.S. Cl. .......................... 707/722; 707/769; 707/913
(58) Field of Classification Search .......... 707/999.001–999.005, 722
See application file for complete search history.

(56) References Cited

U.S. PATENT DOCUMENTS

| | | | | | |
|---|---|---|---|---|---|
| 5,737,533 | A | * | 4/1998 | de Hond | 707/E17.111 |
| 6,023,270 | A | * | 2/2000 | Brush et al. | 715/741 |
| 6,036,601 | A | * | 3/2000 | Heckel | 705/27 |
| 6,175,842 | B1 | * | 1/2001 | Kirk et al. | 707/999.003 |
| 6,183,366 | B1 | * | 2/2001 | Goldberg et al. | 463/42 |
| 7,028,001 | B1 | * | 4/2006 | Muthuswamy et al. | 705/14.73 |
| 2002/0007314 | A1 | * | 1/2002 | Maruyama | 705/14 |
| 2002/0009978 | A1 | * | 1/2002 | Dukach et al. | 455/99 |
| 2003/0126035 | A1 | * | 7/2003 | Kake et al. | 705/26 |
| 2004/0147265 | A1 | * | 7/2004 | Kelley et al. | 455/445 |
| 2004/0248649 | A1 | * | 12/2004 | Arai et al. | 463/32 |
| 2007/0070066 | A1 | * | 3/2007 | Bakhash | 345/419 |

FOREIGN PATENT DOCUMENTS
JP 2000-311256 11/2000
(Continued)

OTHER PUBLICATIONS

Van Hemel, Sven; et al. "Smart Search in Newspaper Archives Using Topic Maps", Department of Electrical Engineering, Katholieke Universiteit Leuven, 2003, pp. 252-260.

(Continued)

*Primary Examiner* — Mohammad Ali
*Assistant Examiner* — Kannan Shanmugasundaram
(74) *Attorney, Agent, or Firm* — Michaud-Kinney Group LLP

(57) ABSTRACT

In an information providing system, a virtual three-dimensional space is established. Users of mobile communication terminals virtually move in the virtual space by manipulating an avatar representing the user and obtain advertisement information through electronic signboards. Users of information providing terminals place electronic signboards at appropriate positions in the virtual space and provide announcement information for the users of the mobile communication terminals. An information management server manages the announcement information provided by the information providing terminals and generates links each of which lead from advertisement information to other advertisement information. The information management server determines priorities for such links, based on use of advertisement information by the users of the mobile communication terminals. The information management server displays the links differently depending on the priorities. For example, a link to an announcement information item which is browsed more frequently is displayed more conspicuously than other links.

6 Claims, 15 Drawing Sheets

FOREIGN PATENT DOCUMENTS

JP  2004-178086  6/2004

OTHER PUBLICATIONS

Hoare, C.; et al. "Information Foraging with a Proximity-Based Browsing Tool", Artificial Intelligence Review, vol. 24, No. 3-4, Oct. 25, 2005, pp. 233-252.
Benford, Steve; et al. "Visualising and Populating the Web: Collaborative Virtual Environments for Browsing, Searching and Inhabiting Webspace", Computer Networks and ISDN Systems, vol. 29, No. 15, Nov. 1, 1997, pp. 1751-1761.
Rohrer, Randall M.; et al. "Web-Based Information Visualization" IEEE Computer Graphics and Applications. 1997, pp. 52-59.
Fairchild, Kim M.; et al. "SemNet: Three-Dimensional Graphic Representations of Large Knowledge Bases", Cognitive Science and Its Applications for Human-Computer Interaction, 1988, pp. 201-233.
European Patent Office Communication dated Aug. 22, 2008.
European Office Action dated Apr. 16, 2009.

* cited by examiner

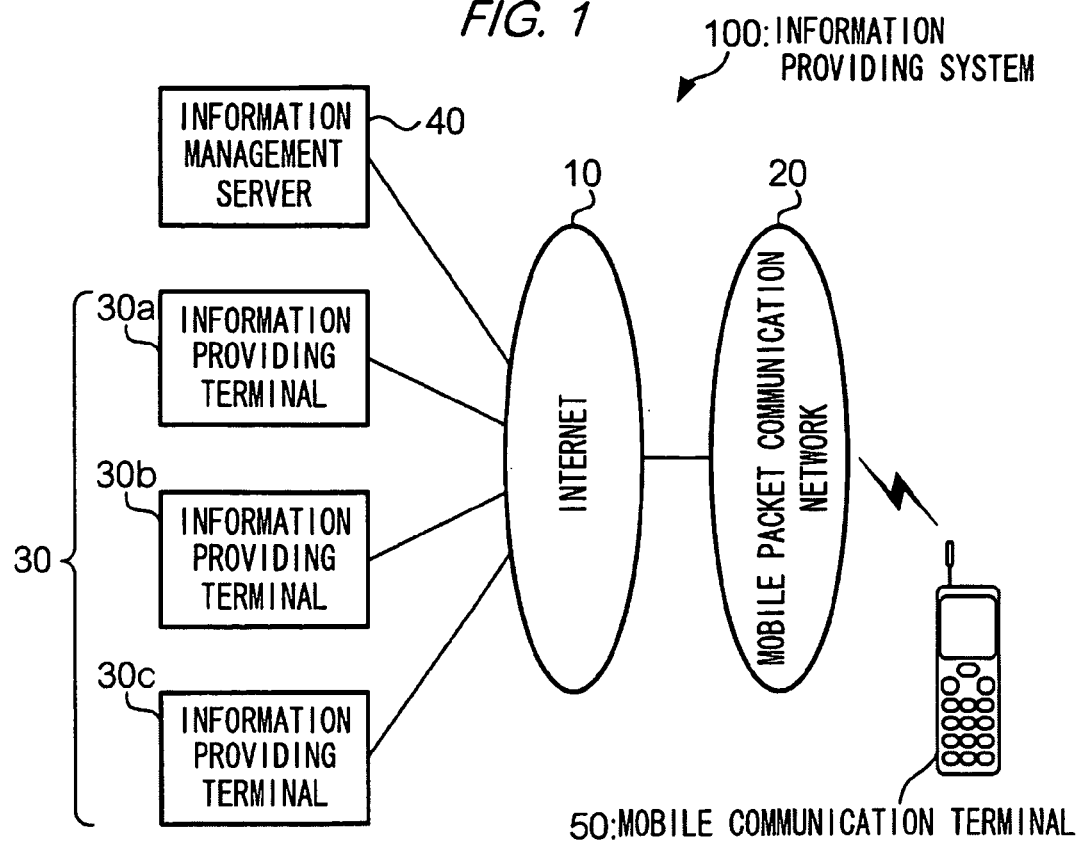
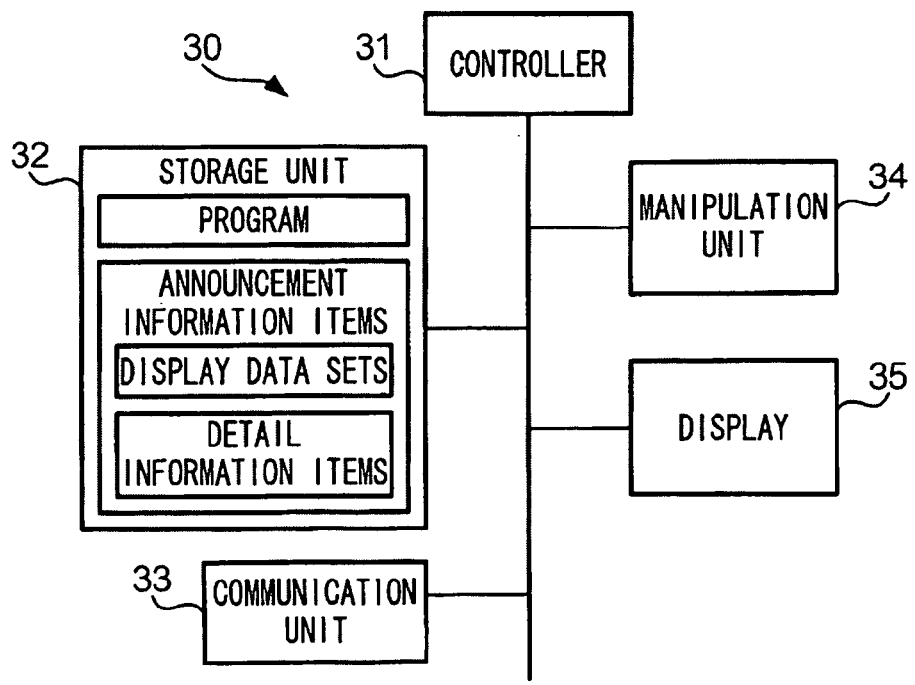

| TERM ID | TERM | RELEVANT TERM ID |
|---|---|---|
| 1 | MOTION PICTURE | 2,3,5 |
| 2 | THEATER | 1,3,5 |
| 3 | CINEMA | 1,2,5 |
| 4 | GOURMET | 6,7,8 |
| 5 | MOVIE | 1,2,3 |
| 6 | LUNCH | 4,7 |
| 7 | SUSHI | 4,6,8 |
| 8 | DINNER | 4,7 |
| ⋮ | ⋮ | ⋮ |

| POSITION INFORMATION | DISPLAY DATA | KEYWORD | ADDRESS INFORMATION |
|---|---|---|---|
| x=⋯,y=⋯,z=⋯ | ⋯⋯⋯.gif | MOTION PICTURE | http://⋯⋯⋯ |
| ⋮ | ⋮ | ⋮ | ⋮ |

| REFERENCE SOURCE | REFERENCE DESTINATION | DISPLAY TIME |
|---|---|---|
| http://⋯⋯⋯ | http://⋯⋯⋯ | 12.34 |
| ⋮ | ⋮ | ⋮ |

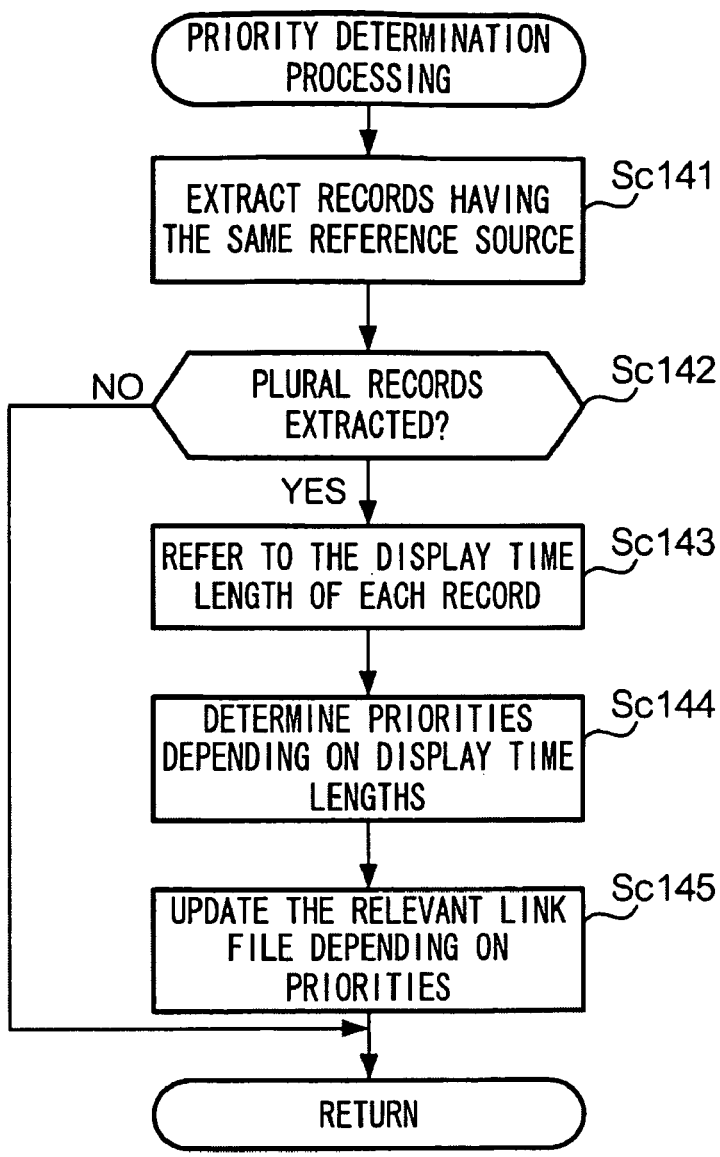

METHOD AND SYSTEM FOR PROVIDING INFORMATION IN VIRTUAL SPACE

BACKGROUND

1. Field of the Invention

The present invention relates to a technique for exchanging a variety of information through a two- or three-dimensional virtual space.

2. Description of the Related Art

There is a known technique for displaying an avatar in a virtual space and moving the avatar in accordance with manipulations made by a user (refer, for example, to JP-A 2000-311256). In another known technique, information such as an advertisement is displayed in a virtual space (refer, for example, to JP-A 2004-178086). By use of these techniques, an avatar can be freely moved in accordance with manipulations made by a user, and information such as an advertisement can be presented at a position appropriate for the user.

However, with mechanisms of the technique as described above, it is difficult for users to find out advantageous information for the users if a huge number of items of information exist, dispersed in a vast expanse of a virtual space. Even if a user is able to find some information that s/he considers useful, there is a difficulty in further acquiring detailed or relevant information by searching the virtual space, based on the information once found by the user. In addition, advertisers also find that there is a problem that advertisements do not effectively appeal to customers.

SUMMARY

The present invention has been made in view of the foregoing circumstances and provides a technique capable of allowing users to obtain desired information more easily in a virtual space.

To achieve the object of the present invention as described above, a server device according to one aspect of the invention includes: a storage unit that stores keywords and predetermined positions in a virtual space, the keywords being associated with a plurality of announcement information items, and the plurality of announcement information items being respectively associated with the predetermined positions; a first obtaining unit that obtains a position indication information item and a search word from a client terminal, the position indication information item indicating a position in the virtual space, and the search word being used for searching the plurality of announcement information items; a specifying unit that specifies a position included in a predetermined range from the position indicated by the position indication information item obtained by the first obtaining unit, from among the plurality of the predetermined positions stored in the storage unit, thereby to specify an announcement information item associated with the specified position; an extraction unit that extracts one or more keywords relevant to the search word obtained by the first obtaining unit, from among the plurality of keywords stored in the storage unit, thereby to extract one or more of the plurality of announcement information items which are associated with the extracted one or more keywords; a notification unit that notifies the client terminal of one or more of the predetermined positions associated with the one or more of the plurality of announcement information items extracted by the extraction unit; a second obtaining unit that obtains an identification information item from the client terminal notified of the one or more of the predetermined positions by the notification unit, the identification information item being capable of identifying one of the plurality of announcement information items which is associated with one of the notified one or more of the predetermined positions; an association unit that associates a link information item with the announcement information item specified by the specifying unit, the link information item linking to the announcement information item identified by the identification information item obtained by the second obtaining unit; and an output unit that outputs the link information item associated by the association unit.

Alternatively, the server device according to the one aspect of the invention may be configured so as to further include: a time obtaining unit that obtains a time information item indicating a display time length on the client terminal for each of the plurality of announcement information items, and a determination unit that determines, if an announcement information item is associated with a plurality of link information items, an order of priority for displaying each of the plurality of link information items, based on the time information item obtained by the time obtaining unit, wherein the determination unit determines the priority such that a higher priority is given to a link information item linking to one of the plurality of link information items for which the display time length obtained by the time obtaining unit is longer.

Also alternatively, the server device according to the one aspect of the invention may be configured so as to further include: a history storage unit that stores a history information item indicating frequency/length of use for each of the plurality of announcement information items stored in the storage unit, the history information item indicating how frequently or long each of the plurality of announcement information items stored in the storage unit has been used; and a determination unit that determines, if an announcement information item is associated with a plurality of link information items, a priority concerning display for each of the plurality of link information items, based on the history information item stored in the history storage unit, wherein the determination unit determines the priority so that a higher priority is given to a link information item linking to one of the plurality of link information items for which the history information item stored in the history storage unit indicates higher frequency of use.

Also alternatively, the server device according to the one aspect of the invention may be configured so that the storage unit stores site location information items indicating site locations of the plurality of announcement information items, with the site location information items associated with the keywords and the predetermined positions, the extraction unit extracts the one or more of the plurality of announcement information items, based on the site location information items stored in the storage unit, and the specifying unit specifies the announcement information item, based on the site location information items stored in the storage unit.

Also alternatively, the server device according to the one aspect of the invention may be configured so that the storage unit stores the plurality of announcement information items.

According to another aspect of the invention, there is provided an information providing method including: storing keywords and predetermined positions in a virtual space into a storage unit, the keywords being associated with a plurality of announcement information items, and the plurality of announcement information items being respectively associated with the predetermined positions; obtaining a position indication information item and a search word from a client terminal, the position indication information item indicating a position in the virtual space, and the search word being used for searching the plurality of announcement information items; specifying a position included in a predetermined range from the position indicated by the obtained position indication information item, from among the plurality of the predetermined positions stored in the storage unit, thereby to specify an announcement information item associated with the specified position; extracting one or more keywords relevant to the obtained search word, from among the plurality of keywords stored in the storage unit, thereby to extract one or more of the plurality of announcement information items which are associated with the extracted one or more keywords; notifying the client terminal of one or more of the predetermined positions associated with the extracted one or more of the plurality of announcement information items; obtaining an identification information item from the client terminal notified of the one or more of the predetermined positions, the identification information item being capable of identifying one of the plurality of announcement information items which is associated with one of the notified one or more of the predetermined positions; associating a link information item with the specified announcement information item, the link information item linking to the announcement information item identified by the obtained identification information item; and outputting the associated link information item.

According to still another aspect of the invention, there are provided a program for realizing steps executed by the server device described above, and a recording medium on which the program is recorded. The program according to this aspect of the invention, for example, causes a computer to execute a process, the computer including a storage unit that stores keywords and predetermined positions in a virtual space, the keywords being associated with a plurality of announcement information items, the plurality of announcement information items being respectively associated with the predetermined positions, and the process comprising; obtaining a position indication information item and a search word from a client terminal, the position indication information item indicating a position in the virtual space, and the search word being used for searching the plurality of announcement information items; specifying a position included in a predetermined range from the position indicated by the obtained position indication information item, from among the plurality of the predetermined positions stored in the storage unit, thereby to specify an announcement information item associated with the specified position; extracting keywords relevant to the obtained search word, from among the plurality of keywords stored in the storage unit, thereby to extract one or more of the plurality of announcement information items which are associated with the extracted keywords; notifying the client terminal of one or more of the predetermined positions associated with the extracted one or more of the plurality of announcement information items; obtaining an identification information item from the client terminal notified of the one or more of the predetermined positions, the identification information item being capable of identifying one of the plurality of announcement information items which is associated with one of the notified one or more of the predetermined positions; associating a link information item with the specified announcement information item, the link information item linking to the announcement information item identified by the obtained identification information item; and outputting the associated link information item.

BRIEF DESCRIPTION OF THE DRAWINGS

An embodiment of the invention will be described in detail based on the following figures, wherein:

FIG. 1 schematically shows an entire configuration of an information providing system according to an embodiment of the invention;

FIG. 2 is a block diagram showing a structure of an information providing terminal;

FIG. 7 shows a structure of the relevant link file;

FIG. 8 shows a structure of an announcement information management table;

FIG. 9 shows a structure of a link management table;

FIG. 26 is a flowchart showing a priority determination processing executed by the controller of the information management server; and FIG. 27 shows a modification of the link management table.

DETAILED DESCRIPTION OF THE INVENTION

Figure 3:
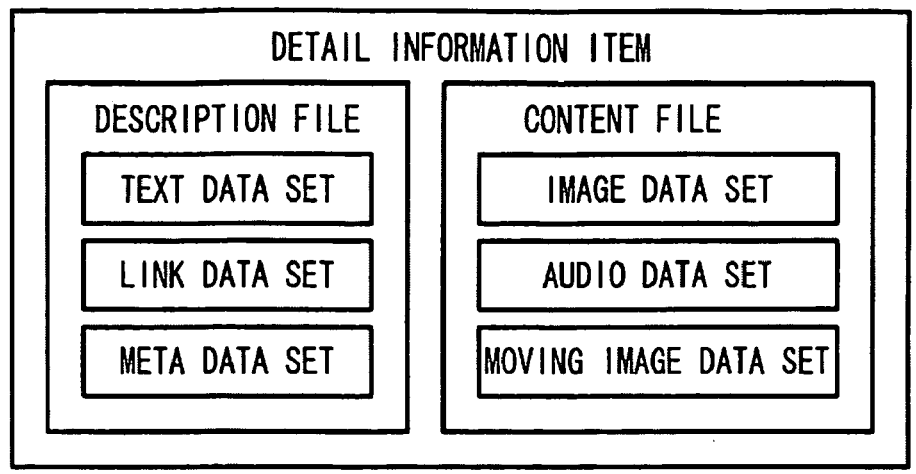
FIG. 3 conceptually shows data constituting a detail information item.

Hereinafter, an exemplary embodiment of the invention will be described with reference to the drawings.

Configuration

FIG. 1 schematically shows an entire configuration of an information providing system 100 according to an embodiment of the invention. As shown in the figure, the information providing system 100 includes the Internet 10, a mobile packet communication network 20, information providing terminals 30a, 30b, and 30c, an information management server 40, and mobile communication terminals 50. The information providing terminals 30a, 30b, and 30c will be hereinafter collectively referred to simply as "information providing terminals 30" where these terminals 30a, 30b, and 30c need not particularly be distinguished from each other. In practice, more information providing terminals 30 and/or mobile communication terminals 50 may be provided than those shown in the figure.

In the information providing system 100, a virtual three-dimensional space (hereinafter a "virtual space") is produced by the information management server 40. Each of users of the mobile communication terminals 50 virtually moves in the virtual space by manipulating an avatar representing the user, and obtains a variety of information through other avatars or electronic signboards which will be described later. Users of the information providing terminals 30 place electronic signboards at appropriate positions in the virtual space, to provide information for users of the mobile communication terminals 50.

Further, structures of respective parts of the information providing system 100 will now be described below.

The Internet 10 is a network including server devices and routers which are not shown. The Internet 10 connects the information providing terminals 30 and the information management server 40 to each other. The Internet 10 transfers data by use of procedures according to TCP/IP (Transmission Control Protocol/Internet Protocol) or procedures according to HTTP (HyperText Transfer Protocol), SMTP (Simple Mail Transfer Protocol), or the like which works on TCP/IP.

The mobile packet communication network 20 is a network for providing mobile packet communication services for the mobile communication terminals 50. In the mobile packet communication network 20, data is transferred by use of procedures which comply with a simplified version of TCP/IP or a protocol equivalent to HTTP which runs on the simplified version of TCP/IP. The mobile packet communication network 20 is managed by a predetermined communication provider (a so-called carrier). The mobile packet communication network 20 includes base stations, exchange centers, and gateway servers which are not shown. The gateway servers each are a server device which performs protocol conversions and contribute to establishment of mutual communication between the Internet 10 and the mobile packet communication network 20.

The information providing terminals 30 each are a computer device which provides announcement information items, in the present system. The information providing terminals 30 each have a structure shown in a diagram of FIG. 2. That is, each information providing terminal 30 includes a controller 31, a storage unit 32, a communication unit 33, a manipulation unit 34, and a display 35.

The controller 31 has a CPU (Central Processing Unit), a ROM (Read Only Memory), a RAM (Random Access Memory), etc. The CPU executes programs stored in the ROM and the storage unit 32 by using the RAM as a work area, to control respective parts constituting the information providing server 30. The storage unit 32 has a storage device such as a HDD (Hard Disk Drive), and stores the programs executed by the controller 31 and announcement information items as described above. The programs stored in the storage unit 32 include, for example, not only a program which controls basic operations of the information providing terminal 30 but also a program for browsing data described in an HTML format or a format compatible with the HTML format. The communication unit 33 is an interface device for making communication via the Internet 10. The manipulation unit 34 includes manipulators such as buttons, and supplies the controller 31 with manipulation signals in response to manipulations by an administrator. The display 35 is a display device which includes a liquid crystal panel and a liquid crystal driving circuit which are not shown. The display 35 displays information in accordance with image signals supplied from the controller 31.

In this embodiment, items of data for informing users of the mobile communication terminals 50 of a variety of information are collectively referred to as "announcement information items". Announcement information items may be advertisements for commercial purposes, or personal opinions of users (such as so-called word-of-mouth information). More specifically, announcement information items are roughly divided into data sets displayed as announcement media (i.e., electronic signboards), and information items describing content of announcements. In the following, data sets which are displayed as electronic signboards in the virtual space will be referred to as "display data sets", and information items which describe content of announcements will be referred to as "detail information items".

The display data sets mentioned above each describe an outer appearance of an electronic signboard presented in the virtual space. In this embodiment, the "display data sets" are media for attracting users of the mobile communication terminals 50, and are associated with detail information items. Each of display data sets to be displayed as an electronic signboard is, for example, data expressed as a sentence (text), an image, and/or a moving image, which has a predetermined size as a whole. Each of the detail information items is a collection of data sets which describe content of an announcement in detail. The detail information item can include not only a text information item but also an image data set, an audio data set, and/or a program data set for executing a predetermined program.

FIG. 3 conceptually shows data sets constituting a detail information item. As shown in the figure, each detail information item has a description file and a content file. The description file is a collection of data sets which describe a structure of the detail information item and an output style to be set in a mobile communication terminal 50. The description file is written in a HTML (HyperText Markup Language) format or a format according to HTML. The description file includes a text data set, a link data set, and a meta data set.

The text data set includes a sentence (text) to be displayed as detail information and a display style (such as an outer appearance) of the sentence. The link data set designates a content file to be output (or displayed, reproduced, or the like) as a detail information item and describes an output style of the content file. The content file designated by the link data may be any data other than content files stored in the storage unit 32 (for example, data stored in other server devices). The meta data set describes a term relevant to the announcement information item to which the description file belongs. The meta data set corresponds to a part of keywords which will be described later.

The content file is a collection of data sets which are output in any form other than text, in a detail information item. The content file includes an image data set, an audio data set, and/or a moving image data set. The content file may also include a program capable of executing a predetermined processing. Each of data sets constituting a content file, such as an image data set and/or a program, will be hereinafter referred to as a "content item".

Figure 4:
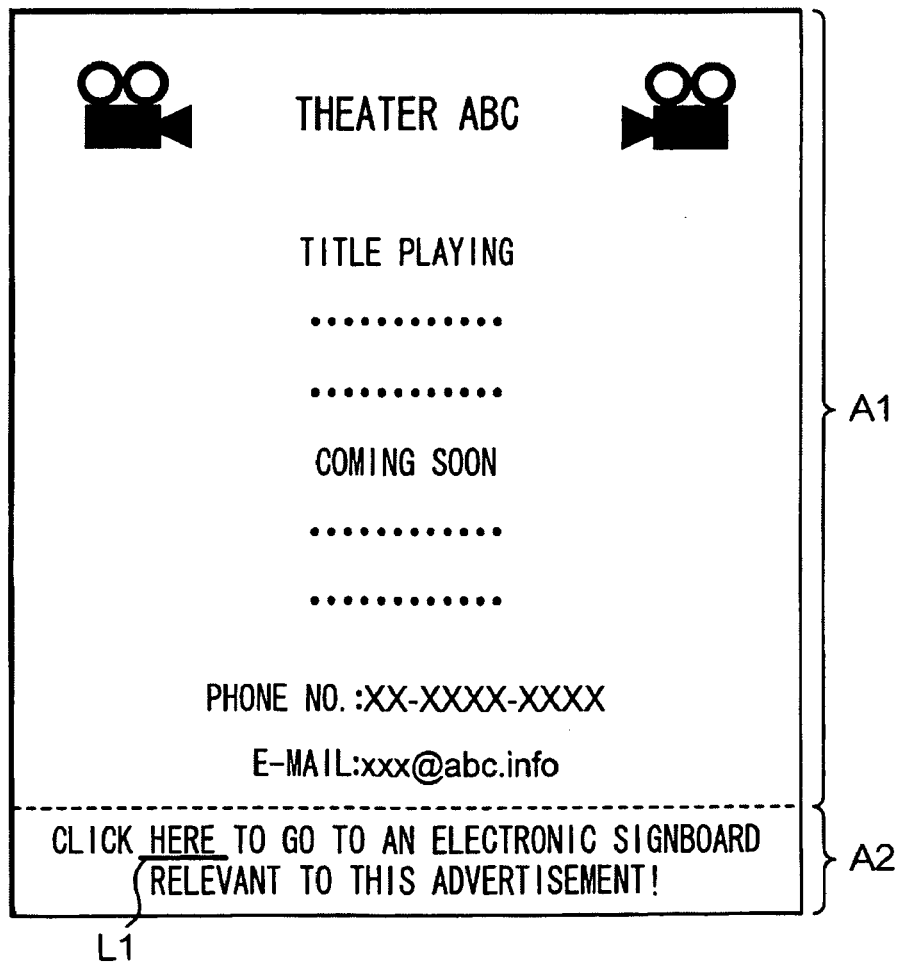
FIG. 4 shows an example of a detail information item displayed on the mobile communication terminal.

How a detail information item is displayed on a mobile communication terminal 50 will now be described with reference to an example. FIG. 4 shows an example of a detail information item displayed on a mobile communication terminal 50. As shown in the figure, the detail information item includes a user definition area A1 and a relevant link area A2. The user definition area A1 is an area for showing a sentence or a content item which are defined in advance by a user of an information providing terminal 30. On the other side, the relevant link area A2 is an area for showing a character string L1 as a link to a file generated by the information management server 40. The file designated by the character string L1 describes a link which leads to another announcement information item relevant to the detail information item. This file will be hereinafter referred to as a "relevant link file".

Information providing terminals 30 are assigned with information items which uniquely identify the information providing terminals, respectively. In this embodiment, domain names are used as such information items. Similarly, files constituting detail information items are assigned with information items which uniquely identify the files, respectively. In this embodiment, URIs (Uniform Resource Identifiers) are used as such information items, and respectively indicate site locations where resources are located on the Internet 10. URIs which designate announcement information items provided by the information providing terminals 30 include domain names of the information providing terminals 30, respectively. However, the information items which thus identify the information providing terminals 30 and detail information items may be any information items other than domain names and URIs.

Figure 5:
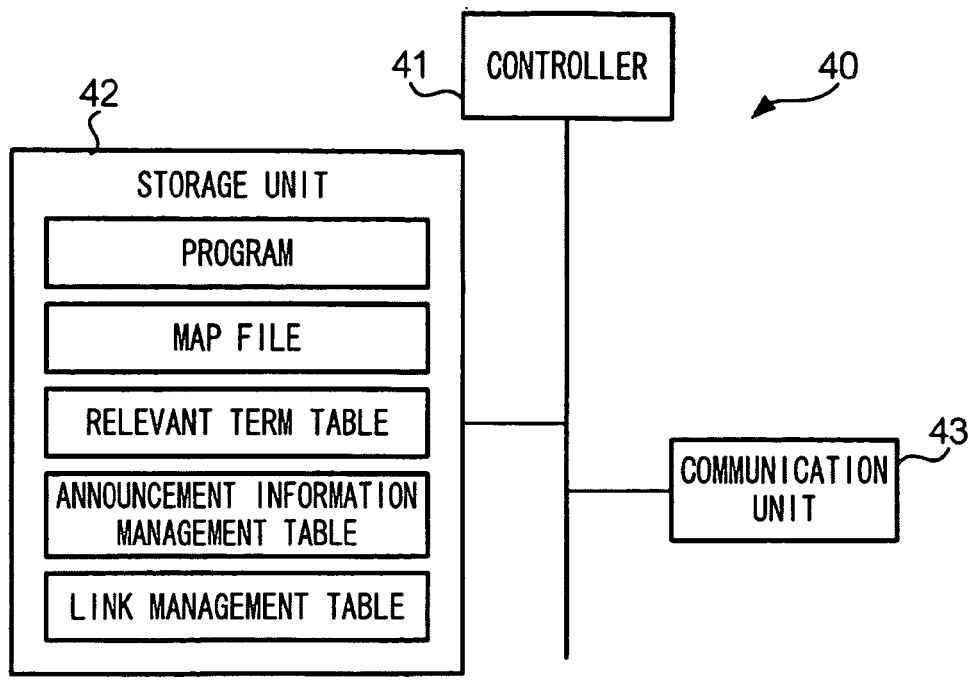
FIG. 5 is a block diagram showing a structure of an information providing server.

Described further will be a structure of the information management server 40. The information management server 40 provides users of the mobile communication terminals 50 with a virtual space as a spot for communication through avatars, and also provides a virtual space for providing information for users of the information providing terminals 30. The information management server 40 also functions as a Web server. The information management server 40 has a structure as shown in a block diagram of FIG. 5. That is, the information management server 40 has a controller 41, a storage unit 42, and a communication unit 43.

The controller 41, storage unit 42, and communication unit 43 respectively have similar structures to those of the controller 31, storage unit 32, and communication unit 33 in each of the information providing terminals 30. However, data stored in the storage unit 42 differs from that stored in the storage unit 32. The storage unit 42 stores a map file, a relevant term table, and a link management table, in addition to programs executed by the controller 41. The storage unit 42 maintains an area for storing display data sets described previously, and an area for storing relevant link files also described previously, separately from an area for storing the foregoing map file, tables, and programs.

Figure 6:
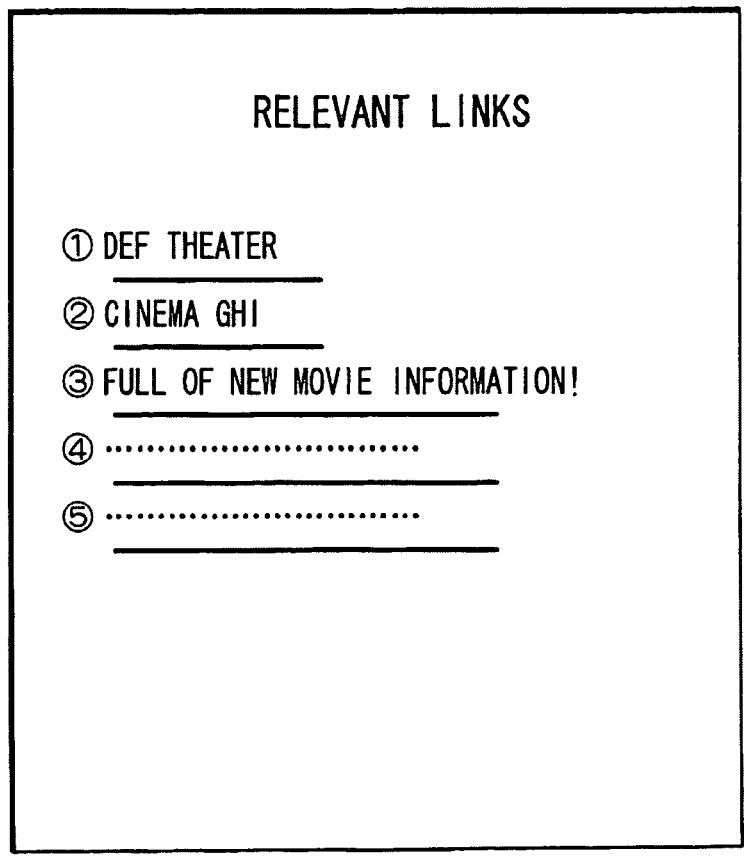
FIG. 6 shows an example of a list of links described in a relevant link file.

Data stored in the storage unit 42 will now be described in detail. At first, each relevant link file is a file indicating relevance between announcement information items, and one relevant link file is generated for one announcement information item. The relevant link file lists up links, each of which leads from an announcement information item to another announcement information item. Similarly to the description file described previously, each relevant link file is written in a HTML format or a format compatible with the HTML format. When a mobile communication terminal 50 issues a request for obtaining a relevant link file, the controller 41 then outputs a corresponding relevant link file. FIG. 6 shows an example of a list of links indicated by a relevant link file. In this figure, underlined character strings indicate links.

The map file is a collection of data which expresses a virtual space. The map file includes object data sets and position information items. The object data sets each express objects, such as buildings and roads, which form part of the virtual space. The object data sets each define a shape and color or, in other words, an outer appearance of an object. The position information items each are information expressed on the bases of a predetermined coordinate system, and each define a position in the virtual space. This embodiment utilizes an orthogonal coordinate system on which positions are defined as coordinates on x-, y-, and z-axes which are orthogonal to each other.

The position of each of objects defined by object data sets is specified by a position information item. That is, objects are respectively associated with positions indicated by position information items. The objects defined by object data sets are limited to static objects, each of which is fixed to a position in the virtual space, but do not include dynamic objects such as avatars.

The relevant term table describes association between terms and replaceable expressions which can be replaced with the terms (such as synonyms, i.e., words having an equal or similar meaning). The relevant term table has a structure as shown in FIG. 7. In this figure, the relevant term table TB1 is a collection of records each including three fields which respectively correspond to three columns "Term ID", "Term", and "Relevant term ID". These fields each contain content as follows.

The field "Term ID" stores a value (ID) which uniquely identifies a term. This value is an arbitrary digit string which does not overlap between records. The field "Term" includes a value expressing a term. In the figure, this value is represented by ideographical characters. However, an actually stored value is expressed as predetermined code information, such as a character code. The field "Relevant term ID" stores one or plural values which are compatible with the field "Term ID".

The meaning of each record in the relevant term table TB1 will now be described with reference to a specific example. For example, in the record in the first line of the relevant term table TB1 shown in FIG. 7, the field "Term" includes a value "motion picture", and the field "Term ID" includes values "2", "3", and "5". That is, terms relevant to "motion picture" are "theater", "cinema", and "movie" which are respectively associated with the values "2", "3", and "5".

The announcement information management table is a table which describes association between display data sets and detail information items. The announcement information management table has a structure as shown in FIG. 8. In the figure, the announcement information management table TB2 is a collection of records each including fields which respectively correspond to four columns "Position information", "Display data", "Keyword", and "Address information". Each of the fields has content as described below.

The field "Position information" stores a value indicating a display position of a display data set in the virtual space. This value is described as coordinates on x-, y-, and z-axes, like position information items in the map file. The field "Display data" stores a value indicating a location (address) of the display data set in the storage unit 42. The field "Keyword" stores a value expressing a term relevant to an announcement information item represented by a corresponding record. This value is, for example, meta data of a detail information item corresponding to the record, or a term relevant to the meta data. The field "Address information" stores a value which uniquely identifies a detail information item corresponding to the record. In this embodiment, this value is a URI of the corresponding detail information item.

The link management table describes relevance between announcement information items and degrees of the relevance. The information management server 40 generates a relevant link file, based on the link management table. The link management table has, for example, a structure as shown in FIG. 9. In the figure, the link management table TB3 is a collection of records which respectively correspond to three columns "Reference source", "Reference destination", and "Display time". Each of the fields has content as follows.

The fields "Reference source" and "Reference destination" each store values each of which uniquely identifies an announcement information item. In this embodiment, the values are URIs of detail information items. In the field "Reference source", a URI of a detail information item as a reference source is described. In the field "Reference destination", a URI of a reference destination is described. The relationship between the reference source and the reference destination will be described later. The field "Display time" stores a time length for which an announcement information item as a reference destination is displayed.

Described further will be a structure of each mobile communication terminal 50.

Figure 10:
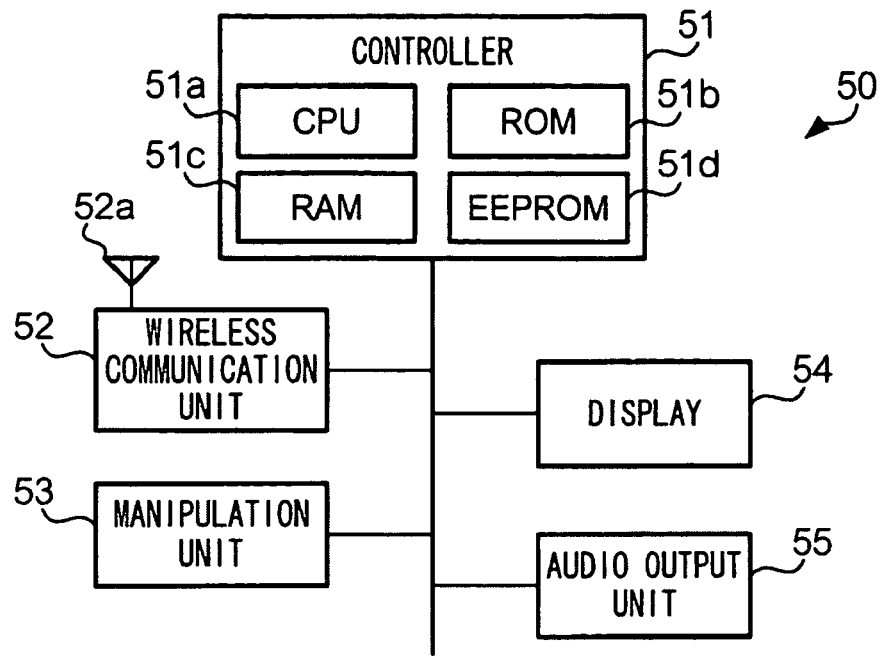
FIG. 10 is a block diagram showing a structure of the mobile communication terminal.

The mobile communication terminal 50 is a communication terminal which makes communications through avatars. In this embodiment, the mobile communication terminals 50 are mobile phones. The mobile communication terminals 50 each have a structure as shown in a block diagram of FIG. 10. That is, the mobile communication terminals 50 each include a controller 51, a wireless communication unit 52, a manipulation unit 53, a display 54, and an audio output unit 55.

The controller 51 includes a CPU 51a, a ROM 51b, a RAM 51c, and an EEPROM (Electronically Erasable and Programmable ROM) 51d. The CPU 51a executes programs stored in the ROM 51b and the EEPROM 51d by using the RAM 51c as a work area, to control respective parts of the mobile communication terminal 50. The wireless communication unit 52 has an antenna 52a and transmits/receives data to/from the mobile packet communication network 20. The manipulation unit 53 has manipulators such as buttons, and supplies the controller 51 with manipulation signals in response to manipulations of a user. The display 54 is a display device which has a liquid crystal panel and a liquid crystal drive circuit. The display 54 displays a variety of information in accordance with instructions from the controller 51. The audio output unit 55 has a loudspeaker, and displays information in accordance with image signals supplied from the controller 51.

Figure 11:
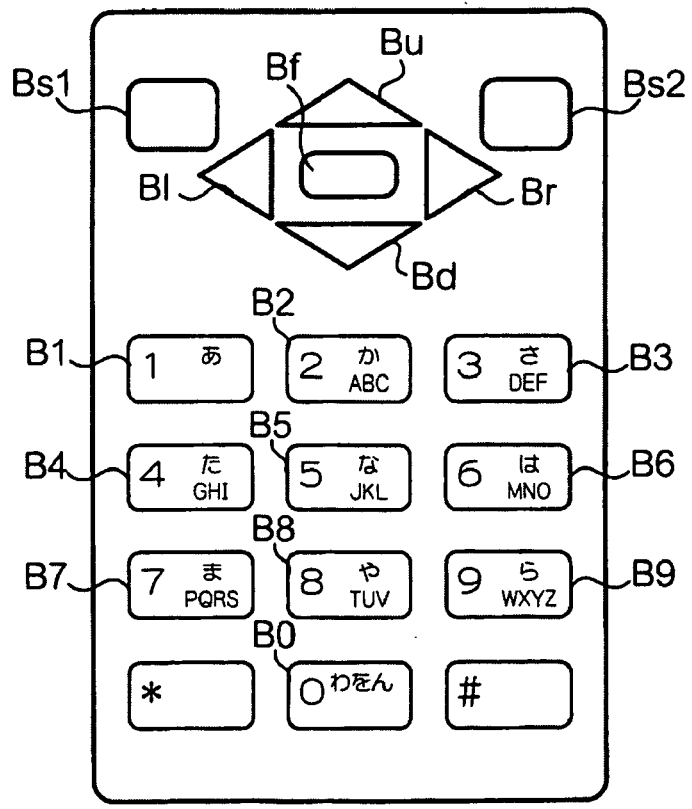
FIG. 11 shows an example of manipulators included in a manipulation unit of the mobile communication terminal.

The manipulators of the manipulation unit 53 will now be described with reference to FIG. 11. As shown in the figure, the manipulation unit 53 includes soft buttons Bs1 and Bs2, move buttons Bu, Bd, Bl, and Br, an enter button Bf, and dial buttons B1 to B0. The soft buttons Bs1 and Bs2 are assigned with predetermined functions depending on a screen displayed on the display 54. The functions assigned to the soft buttons Bs1 and Bs2 will be described later. The move buttons Bu, Bd, Bl, and Br are to move an object (e.g., an avatar or a pointer) to be moved, in forward, backward, left, and right directions (or in upward, downward, left, and right directions). The enter button Bf is to select an object displayed on the display 54 and to fix content of a processing to be executed thereafter. The dial buttons B1 to B0 are to input terms.

Further, content of data stored in each of the mobile communication terminals 50 will now be described. The ROM 51b prestores several programs. In the following, the programs will be referred to as "preinstalled programs". Specifically, the preinstalled programs are a multitask operating system (hereinafter "multitask OS"), a Java (registered trademark) platform, and native applications. These programs will now be described in detail. At first, the multitask OS is an operating system which supports various functions including, for example, assignment of virtual memory areas which are required for achieving pseudo parallel execution of multiple tasks based on a TSS (Time-Sharing System). The Java platform is a group of programs which are described in compliance with a CDC (Connected Device Configuration) as a configuration for establishing a Java execution environment 514 in a mobile device using a multitask OS. The Java execution environment 514 will be described later. The native applications are programs for providing basic services for the mobile communication terminals 50, such as telephone conversations, browsing, and transmission/reception of e-mails. The native applications include a mailer application for receiving an e-mail transmission/reception service, and a browser application for receiving a browsing service.

The EEPROM 51d has a Java application storage area where Java applications are stored. The Java applications each include a JAR (Java Archive) file and an ADF (Application Descriptor File). The JAR file combines program modules and image and/or audio files together. The program modules describe processing procedures in the Java execution environment 514, and the image and/or audio files are used when the program modules are executed. The ADF describes various properties concerning installation and activation of the JAR file. Java applications are created by content providers or carriers, and are stored into server devices on the Internet 10. In response to requests from the mobile communication terminals 50, Java applications are appropriately downloaded from the server devices.

Figure 12:
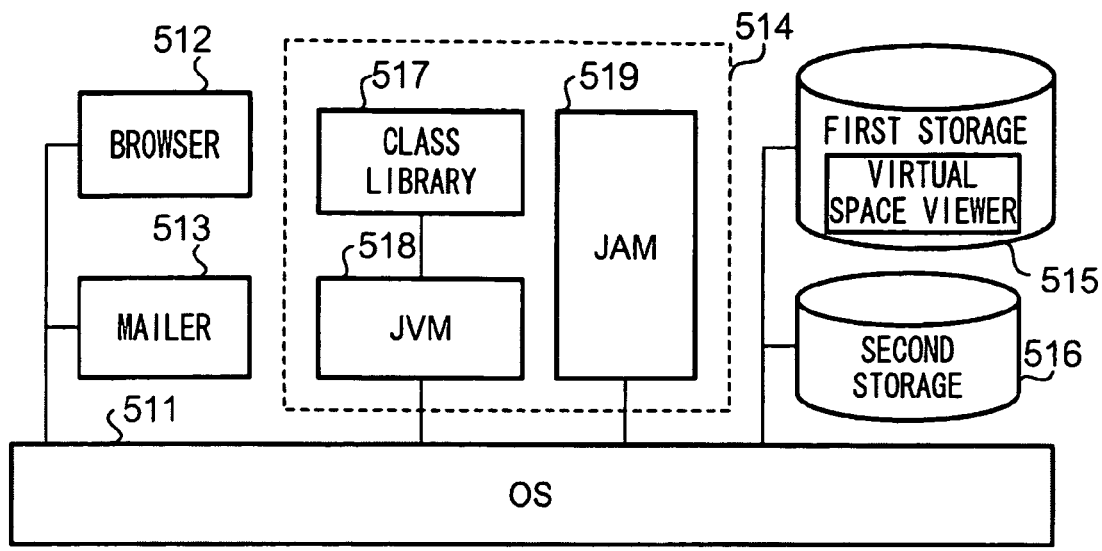
FIG. 12 shows a logical structure of units established by a controller of the mobile communication terminal.

FIG. 12 shows a logical structure of parts which are established as the controller 51 of each mobile communication terminal 50 executes various programs stored in the ROM 51b and the EEPROM 51d. As shown in the figure, each mobile communication terminal 50 establishes a browser 512, a mailer 513, and a Java execution environment 514 on an OS 511 by executing various programs. A first storage 515 and a second storage 516 are maintained in the EEPROM 51d. The browser 512 and the mailer 513 are established by native applications in the ROM 51b and perform functions of receiving and interpreting data described in an HTML format and a format compatible with the HTML format, and functions of transmitting and receiving e-mails.

The Java execution environment 514 is established by the Java platform in the ROM 51b. The Java execution environment 514 is constituted of a class library 517, a JVM (Java Virtual Machine) 518, and a JAM (Java Application Manager) 519. The class library 517 combines a group of program modules (i.e., classes) having a particular function into one file. The JVM 518 is an optimized Java execution environment for the CDC described previously, and interprets and executes byte codes which are provided as a Java application. The JAM 519 functions to manage downloading, installation, and activation/termination of the Java application.

The first storage 515 is an area for storing a Java application (e.g., a Jar file and an ADF) downloaded under management of the JAM 519. The second storage 516 is an area for storing data after termination of a Java application if data has been generated during execution of the Java application. Individual storage areas are allocated to installed Java applications, respectively. Data in a storage area allocated to a Java application is rewritable only while the Java application is being executed. Accordingly, data in a storage area allocated to a Java application cannot be rewritten by any other Java application.

The Java application includes an application for posting, browsing, and searching for message information items in response to instructions from users. This application will be hereinafter referred to as a "virtual space viewer". In this embodiment, the virtual space viewer is prestored in each mobile communication terminal 50.

Operations

Further, descriptions will be made of operations of the information providing terminals 30, information management server 40, and mobile communication terminals 50 in the information provided system 100. Described first will be processings which an information providing terminal 30 executes when registering an announcement information item. Next, information management server 40, and mobile communication terminals 50 will be described with reference to a case where a user of a mobile communication terminal 50 posts a message information item. Described next will be processings which the information management server 40 and a mobile communication terminal 50 carry out when the mobile communication terminal 50 executes a virtual space viewer.

Figure 13:
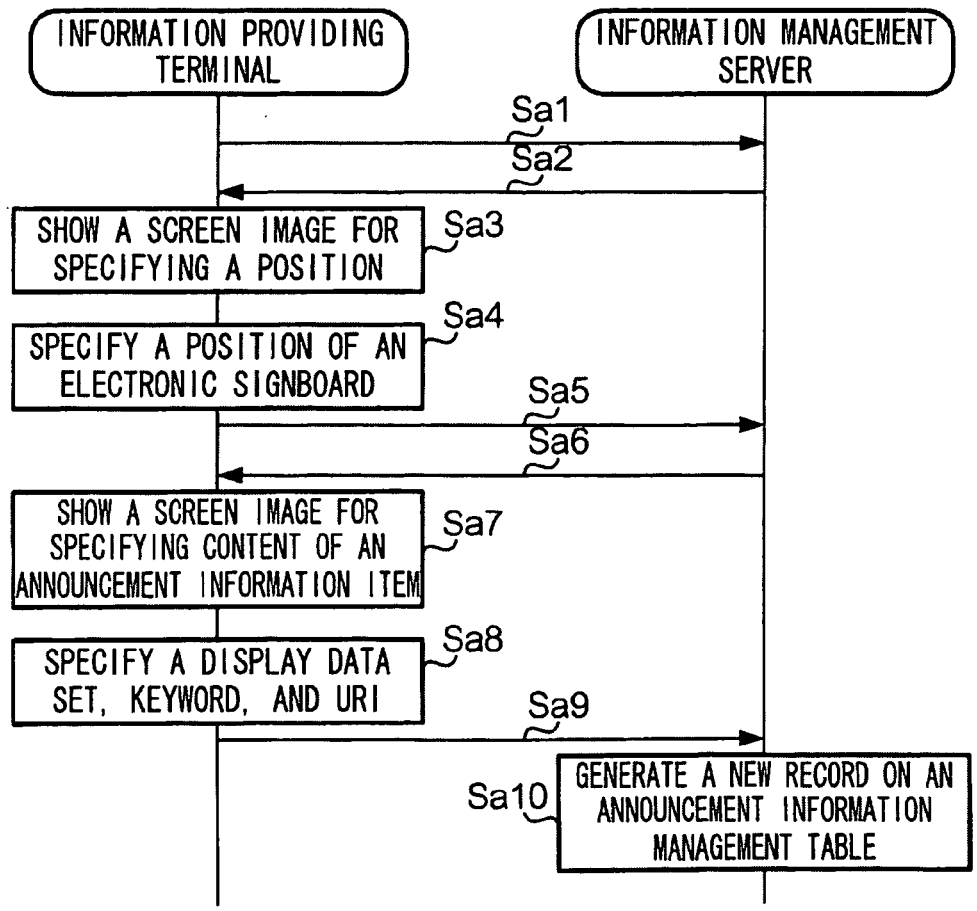
FIG. 13 is a sequence chart showing processings in a case where the information providing terminal registers an announcement information item in the information providing server.

FIG. 13 is a sequence chart showing a processing in case of registering an announcement information item in the information management server 40. According to the sequence chart, at first, the controller 31 of an information providing terminal 30 transmits a request for registering an announcement information item to the information management server 40 (step Sa1). The information management server 40 receives the request, and the controller of the server 40 then transmits a data set for specifying a position of an electronic signboard for the announcement information item to be registered (step Sa2). At this time, the data set transmitted by the controller 41 includes data for displaying a virtual space, which is generated based on the map file stored in the storage unit 42.

Figure 14:
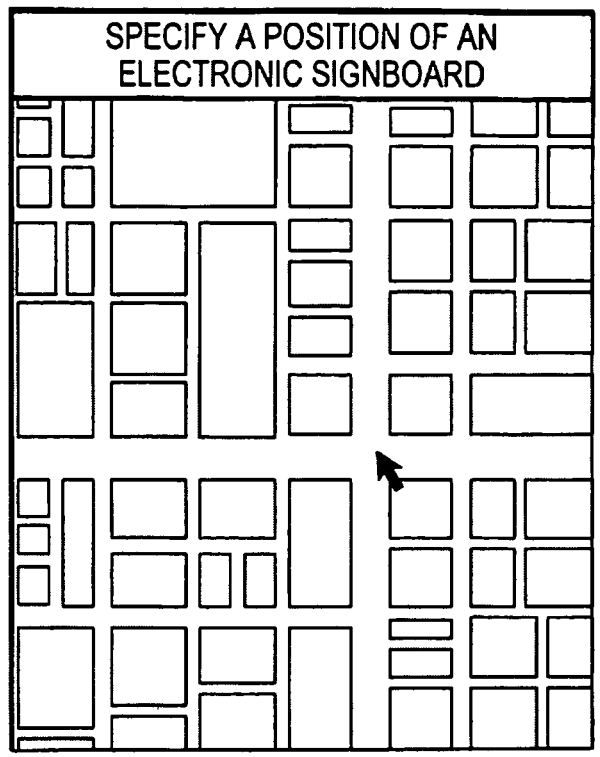
FIG. 14 shows an example of a screen image displayed on a display of the information providing terminal.
Figure 15:
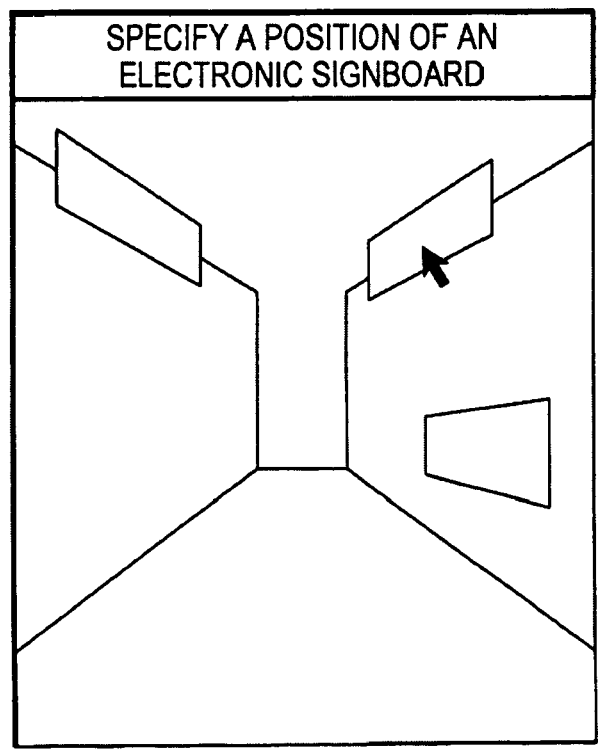
FIG. 15 shows an example of another screen image displayed on the display of the information providing terminal.

The controller 31 of the information providing terminal 30 interprets the data set received from the information management server 40, and supplies the display 35 with an image signal according to the data set, thereby to cause the display 35 to show an image for specifying a position of an electronic signboard (step Sa3). At this time, the display 35 shows screen images as shown in FIGS. 14 and 15. FIG. 14 is a bird's-eye view for roughly specifying a position of the electronic signboard. FIG. 15 shows a screen image for precisely specifying a detailed position of the electronic signboard. As for these figures of which both show parts of the virtual space, the entire area of FIG. 15 corresponds to a part of an entire area of FIG. 14. Black arrows shown in these figures denote pointers which move in accordance with a user's manipulations.

The controller 31 accepts a manipulation from the user, and thereby specifies a desired position of an electronic signboard, i.e., specifies a position where a display data set is shown (step Sa4). Specifically, the controller 31 first causes the display 35 to show a bird's-eye view as shown in FIG. 14, and thereby allows the user to roughly specify a position of an electronic signboard. The user specifies a desired position by using manipulators of the manipulation unit 34. After the user specifies a desired position, the controller 31 subsequently causes the display 35 to show an image as shown in FIG. 15. FIG. 15 shows a vicinity of the position specified by the user in a style close to a sight as viewed from the avatar. Such a screen display will be referred to as a "walk through view". The user more specifically specifies the desired position by using the manipulators of the manipulation unit 34 again.

After the user precisely specifies a detailed desired position, the controller 31 obtains coordinates of the position specified by the user, and transmits the obtained coordinates to the information management server 40 (step Sa5). The controller 41 of the information management server 40 temporarily stores the coordinates, and subsequently transmits data for specifying content of an announcement information item (step Sa6). The controller 31 of the information providing terminal 30 interprets the data received from the information management server 40, and causes the display 35 to show an image for specifying content of the announcement information item (step Sa7). The controller 31 accepts a further manipulation of the user, and thereby specifies a display data set displayed as an electronic signboard, a keyword for the announcement information item, and a URI for the detail information item (step Sa8).

Figure 16:
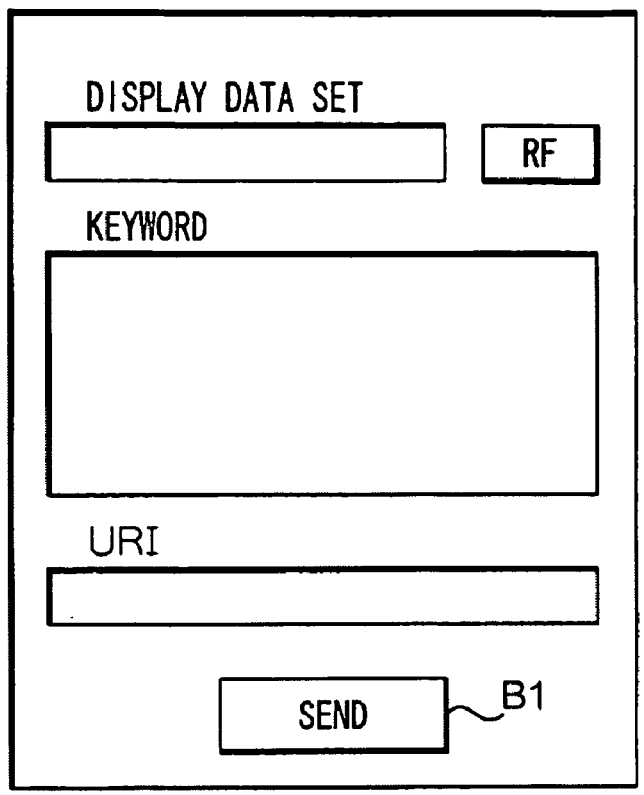
FIG. 16 shows an example of another screen image displayed on the display of the information providing terminal.

At this time, the display 35 shows a screen image as shown in FIG. 16. The user specifies a display data set to be displayed as an electronic signboard, a term (keyword) relevant to the announcement information item, and a URI for the detail information item, by using the screen as shown in the figure, and finally selects a send button B1. In this embodiment, the keyword specified at this time is the same as the meta data set included in the detail information item or may alternatively be an arbitrary term specified by the user.

Upon receiving a manipulation of the user, the controller 31 transmits the display data set, keyword, and URI of the detail information item to the information management server 40 (step Sa9). Further, the controller 41 of the information management server 40 generates a new record in the announcement information management table, based on the foregoing data set and information item (step Sa10). Values in the fields of the record which is generated at this time are determined as follows. That is, the controller 41 sets the coordinates, which have been transmitted in the step Sa5, as values in the field "Position information". The keyword and the URI of the detail information item, which have been transmitted in the step Sa9, are respectively set as values of the fields "Keyword" and "Address information". The controller 41 stores the received display data set in a predetermined area in the storage unit 42, and sets a value expressing the location of the predetermined area, in the field "Display data".

By performing processings as described above, the information management server 40 can show the electronic signboard in the virtual space, and can associate the electronic signboard with the predetermined detail information item. As a result of this, the user of the information providing terminal 30 can provide the user of a mobile communication terminal 50 with information.

A further description will be made of an operation when a mobile communication terminal 50 executes a virtual space viewer. The virtual space viewer has a function to show the virtual space in a walk through view, a function to vary screen display in accordance with movement of the avatar, a function to browse a detail information item associated with an electronic signboard in the virtual space, a function to search electronic signboards in the virtual space, and a function to measure a display time length of an electronic signboard which has been searched for (or a display time length of a detail information item associated with the electronic signboard). In the following, these functions will be described.

Figure 17:
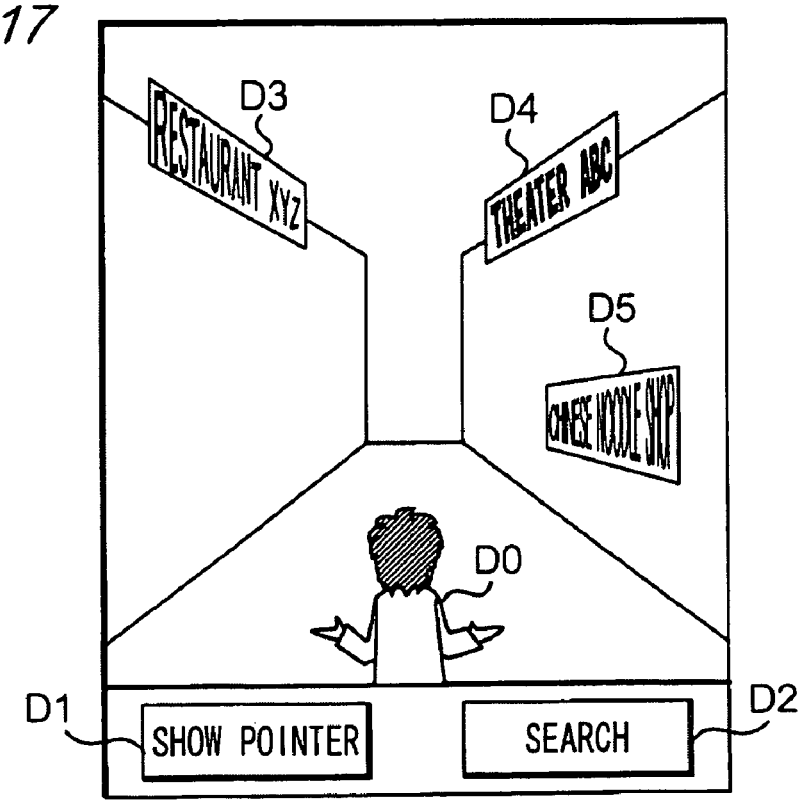
FIG. 17 shows an example of another screen image displayed on the display of the information providing terminal.

FIG. 17 shows an example of a screen image displayed on the display 54 of a mobile communication terminal 50. As shown in the figure, the display 54 shows a virtual space in a walk through view from slightly behind an avatar (image D0). Images D1 and D2 respectively denote functions assigned to the soft buttons Bs1 and Bs2. In the example shown in FIG. 17, the soft button Bs1 is assigned with a function of switching show/hide of a pointer. The soft button Bs2 is assigned with a function of searching electronic signboards in the virtual space.

If the user presses down move buttons Bu, Bd, Bl, and Br in this state, the controller 51 varies displayed content of the display 54 so as to change the position of the avatar in the virtual space. At this time, the controller 51 periodically transmits information indicating the position of the avatar to the information management server 40, and receives object data sets which are positioned within a predetermined range from the changed position of the avatar.

Electronic signboards are displayed as denoted by D3, D4, and D5 in FIG. 14. When shown in the walk through view, sizes and shapes of displayed electronic signboards vary in relation to the position of the avatar. This is achieved by a known method. If the user selects an electronic signboard, the controller 51 obtains a detail information item associated with the electronic signboard through the information management server 40, and causes the display 54 to display the detail information item.

Figure 18:
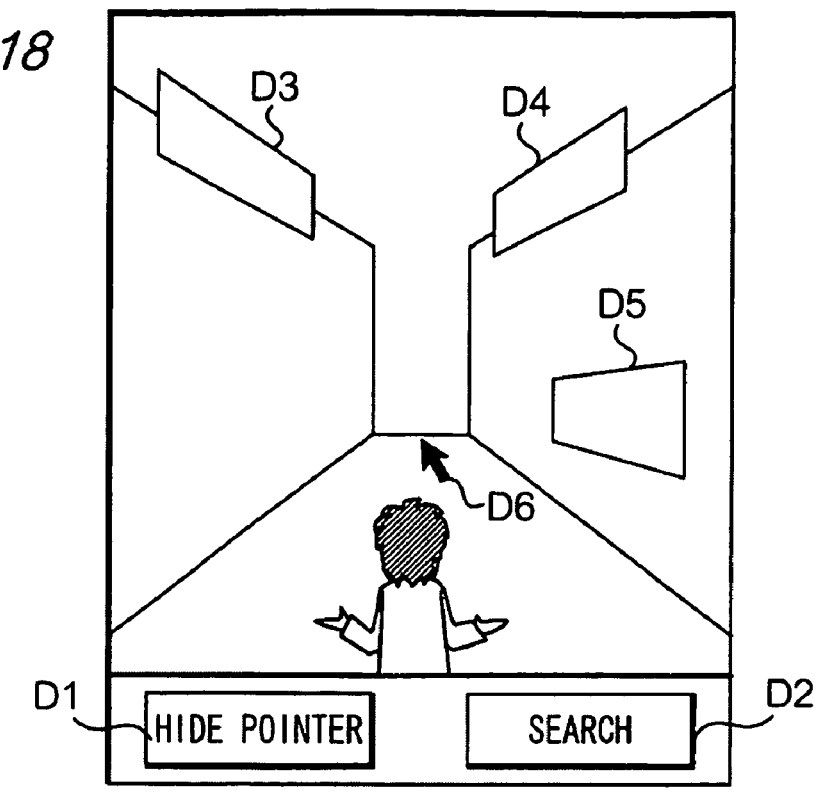
FIG. 18 shows an example of another screen image displayed on the display of the information providing terminal.

To select a bulletin board system, the user firstly presses down the soft button Bs1 when displayed content is as shown in FIG. 17. If the soft button Bs1 is pressed down, the controller 51 then causes the display 54 to show up a pointer. FIG. 18 shows an example where the pointer is shown up. In the figure, an arrow image D6 depicts the pointer. In this state, the user appropriately presses down the move buttons Bu, Bd, Bl, and Br to move the pointer so as to overlap a desired electronic signboard. The user then presses down the enter button Bf. The electronic signboard overlapped under the pointer is selected, and a detail information item associated with the electronic signboard is shown up. To hide the pointer again, the user needs only to press down again the soft button Bs1. When the pointer is hidden, the avatar can then be moved again.

Figure 19:
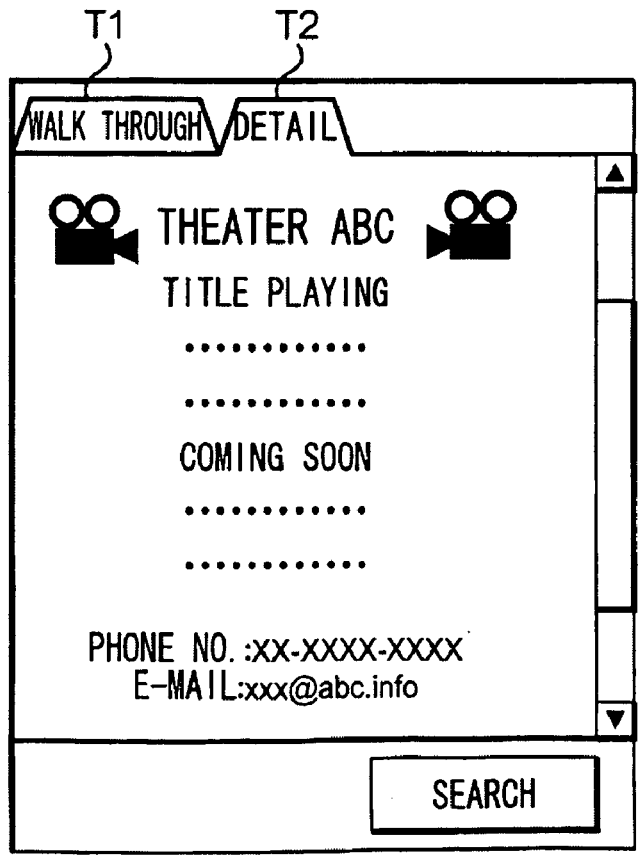
FIG. 19 shows an example of another screen image displayed on the display of the information providing terminal.

FIG. 19 shows an example of a screen image where a detail information item is displayed. As shown in the figure, when a detail information item is displayed, tabs T1 and T2 are shown up at an upper part of the screen image. The user can switch displayed content between a walk through view and a message information item. That is, if the user selects the tab T1, the controller 51 shows a screen image of a walk through view. Otherwise, if the user selects the tab T2, the controller 51 shows a detail information item which has been selected before.

The user can not only find and browse an electronic signboard while moving in the virtual space but also input an arbitrary term to search electronic signboards. To search electronic signboards with a keyword, the user needs only to press down the soft button Bs2. If the soft button Bs2 is pressed, the following operations start. In this embodiment it is assumed that a user refers to electronic signboards and detail information items, and searches for a matter which the user is interested in from among content referred to by the user.

Figure 20:
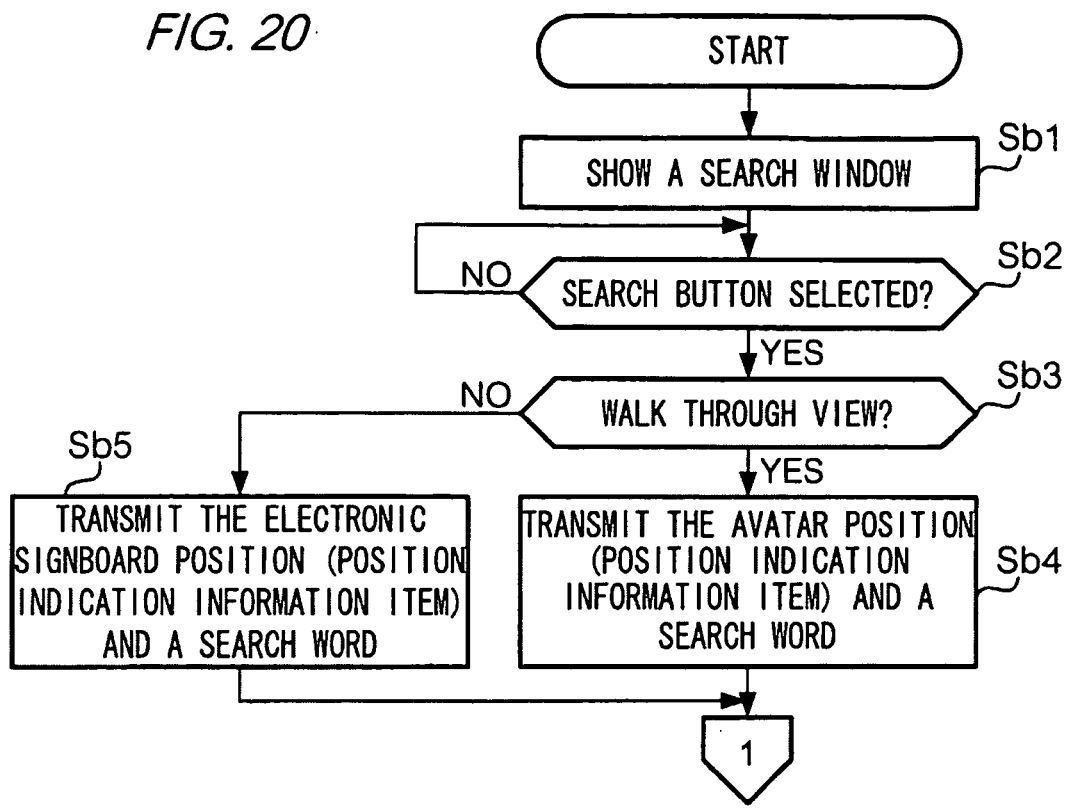
FIG. 20 is a flowchart showing processings executed by the controller of the mobile communication terminal.

FIG. 20 is a flowchart showing a processing which the controller 51 carries out when the soft button Bs2 is pressed. That is, execution of the processing of the flowchart is triggered by supply of a manipulation signal associated with the soft button Bs2 to the controller 51. Along the flowchart, at first, the controller 51 causes the display 54 to show an object (window) for allowing the user to specify a term (hereinafter a "search word") for which electronic signboards are searched (step Sb1). This object will be hereinafter referred to as a "search window".

Figure 21:
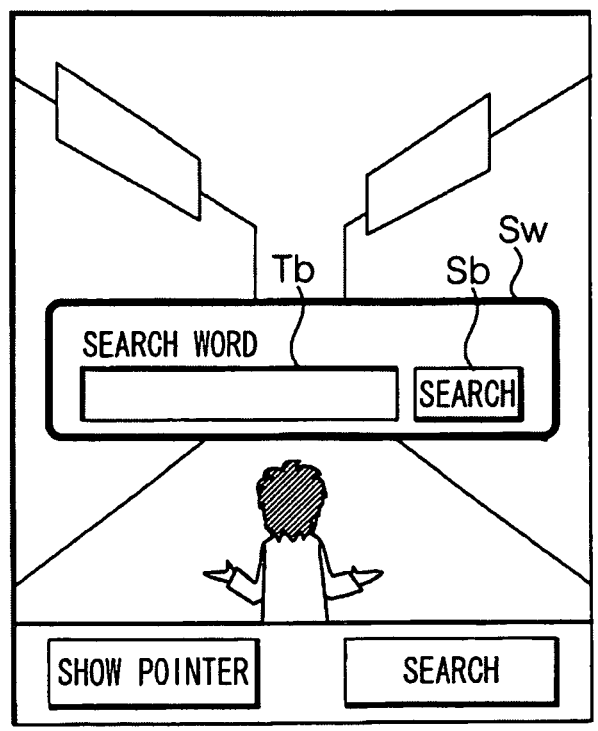
FIG. 21 shows an example of another screen image displayed on the display of the information providing terminal.

FIG. 21 shows an example of a screen image which the controller 51 causes the display 54 to show. As shown in the figure, the controller 51 controls a search window Sw to be displayed over a screen image which has been shown up to now. The search window Sw includes a text box Tb and a search button Sb. The text box Tb is an object which allows a user to input a search word. The user selects the text box Tb and presses the dial buttons B1 to B0. The controller 51 then performs control to show up characters corresponding to pressed buttons in the text box Tb, and temporarily stores the characters. The search button Sb is an object to command execution of a search from electronic signboards. When the user selects this search button Sb with the pointer or the like, the controller 51 then specifies, as a search word, the term displayed in the text box Tb at this time.

A description will now be made referring back to FIG. 20. After showing the search window, the controller 51 waits for a selection of the search button by the user. That is, the controller 51 repeatedly determines whether or not the search button has been selected (step Sb2). If the search button is selected (step Sb2: YES), the controller 51 determines whether content of display which has been displayed is a walk through view or a detail information item when performing a search (step Sb3). Specifically, this determination is made based on a screen image which was displayed under control of the controller 51 at the time when the soft button Bs2 was pressed.

If the display content is a walk through view when a search is being performed (step Sb3: YES), the controller 51 transmits an information item indicating the position of the avatar and the search word to the information management server 40 (step Sb4). The information item indicating the position of the avatar indicates coordinates corresponding to the position, i.e., a position information item. Otherwise, if the display content when performing a search is a detail information item (step Sb3: NO), the controller 51 transmits an information item indicating the position of an electronic signboard associated with the detail information item, together with a search word, to the information management server 40 (step Sb5). The information item indicating the position of an electronic signboard indicates coordinates of a position corresponding to the electronic signboard, i.e., a position information item, too. In order to distinguish the position information item transmitted at this time by the controller 51 from other position information items, the position information item which is transmitted in the step Sb4 or Sb5 will be hereinafter referred to as a "position indication information item".

Figure 22:
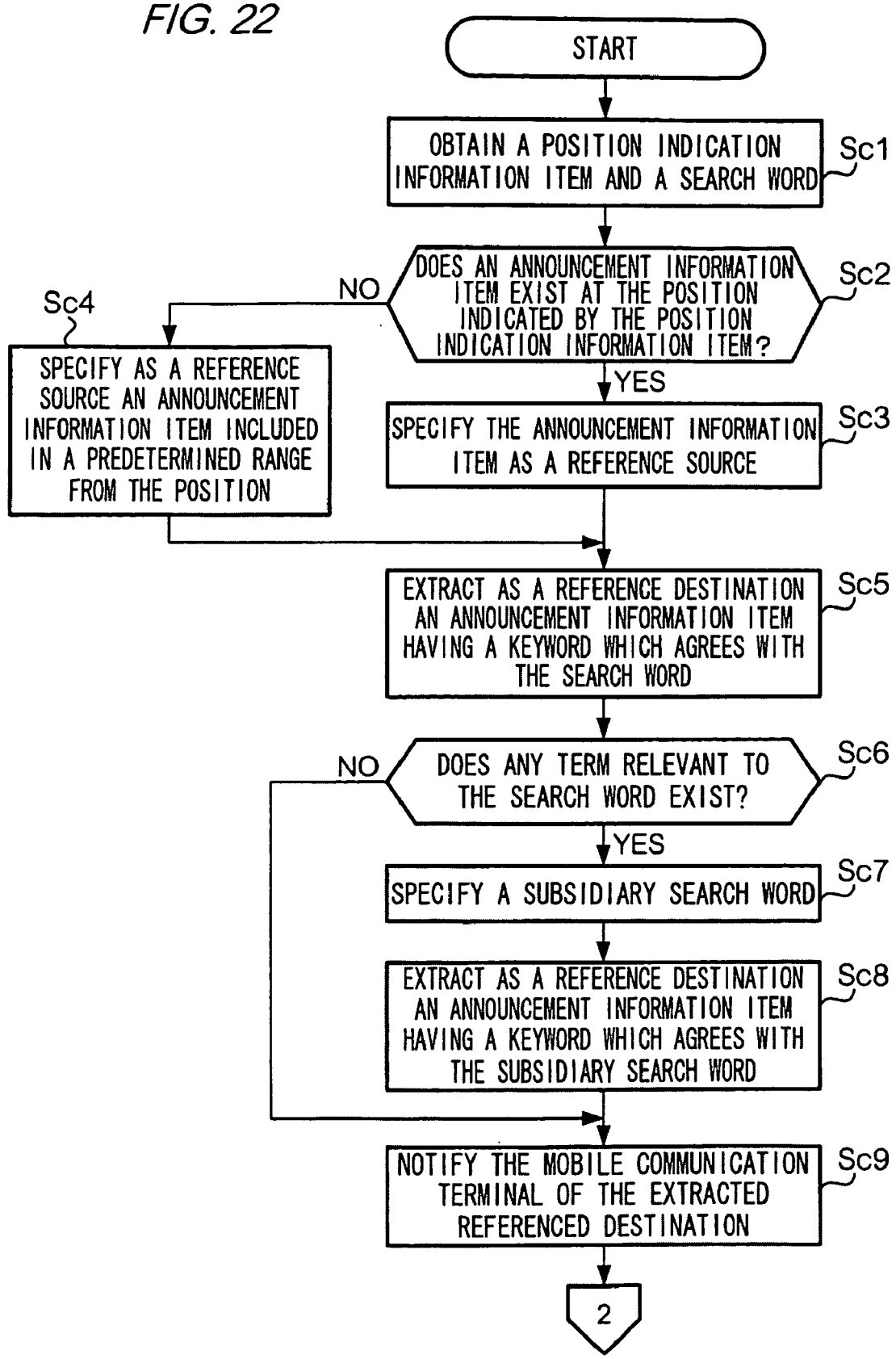
FIG. 22 is a flowchart showing processings executed by the controller of an information management server.

After executing the processing as described above, the mobile communication terminal 50 waits for a response from the information management server 40. The information management server 40 executes a search processing for searching electronic signboards, based on the position indication information item and the search word which the mobile communication terminal 50 has transmitted. FIG. 22 shows a flowchart of a search processing executed by the controller 41 of the information management server 40. Hereinafter, operations of the information management server 40 will be described along the flowchart.

At first, the controller 41 of the information management server 40 obtains the position indication information item and the search word transmitted from the mobile communication terminal 50, through the communication unit 43 (step Sb1). Next, the controller 41 specifies an announcement information item associated with the obtained position indication information item, by referring to the announcement information management table. Specifically, at first, the controller 41 refers to each of records on the announcement information management table, and determines whether or not a position indicated by the value in the field "Position information" in each record agrees with a position indicated by the obtained position indication information item (step Sc2). If such a record exists (step Sb2: YES), the controller 41 specifies, as an announcement information item as a reference source, an announcement information item indicated by the record (step Sc3).

If there is no record in which the value in the field "Position information" agrees with the position indication information item (step Sc2: NO), the controller 41 refers to each record on the announcement information management table, and extracts a record in which the position indicated by the value in the field "Position information" falls within a predetermined range from the position indicated by the obtained position information item. The controller 41 specifies, as an announcement information item as a reference source, an announcement information item indicated by the extracted record (step Sc4). Specifically, the foregoing "predetermined range" is a range which can be displayed in a walk through view, provided that the position indicated by the position indication information item is the position of the avatar. This is because electronic signboards which are located within such a range can be displayed on the display 54 of the mobile communication terminal 50 during performing of a search, and can become triggers which cause the user to execute a search.

After specifying an announcement information item as a reference source, the controller 41 extracts an announcement information item as a reference destination. The controller 41 extracts a keyword relevant to the obtained search word, and specifies an announcement information item associated with the keyword. In this manner, the controller 41 extracts an announcement information item as a reference destination. The keyword extracted at this time need not be a term identical to the obtained search word but may be any term as long as the term has any relevance to the search word. The processing for extracting an announcement information item as a reference destination will now be specifically described below.

The controller 41 refers to each of records in the announcement information management table, and extracts records in each of which the term indicated by a value in the field "Keyword" agrees with the obtained search word (step Sc5). Subsequently, the controller 41 refers to each of records in the relevant term table, and determines whether or not there is a record in which the term indicated by a value in the field "Term" agrees with the obtained search word (step Sc6). If such a record exists (step Sc6: YES), the controller 41 specifies terms indicated by values in the field "Relevant term ID" of the record, and regards these terms as equivalences to the search word (step Sc7). Terms which are regarded, in this manner, as equivalences to a search word will be hereinafter referred to as "subsidiary search words".

If a subsidiary search word is specified, the controller 41 refers again to each of records in the announcement information management table, and extracts a record in which the term indicated by a value in the field "Keyword" agrees with the subsidiary search word (step Sc8). The controller 41 specifies an announcement information item associated with the record extracted in this manner, as an announcement information item as a reference destination.

Further, the controller 41 notifies the mobile communication terminal 50 of information indicating the position of the announcement as a reference destination (step Sc9). Specifically, the controller 41 transmits the value in the field "Position information" in the record extracted in the step Sc5 or Sc8, to the mobile communication terminal 50 through the communication unit 43. At this time, one position is notified in some cases, and plural positions are notified in some other cases.

Figure 23:
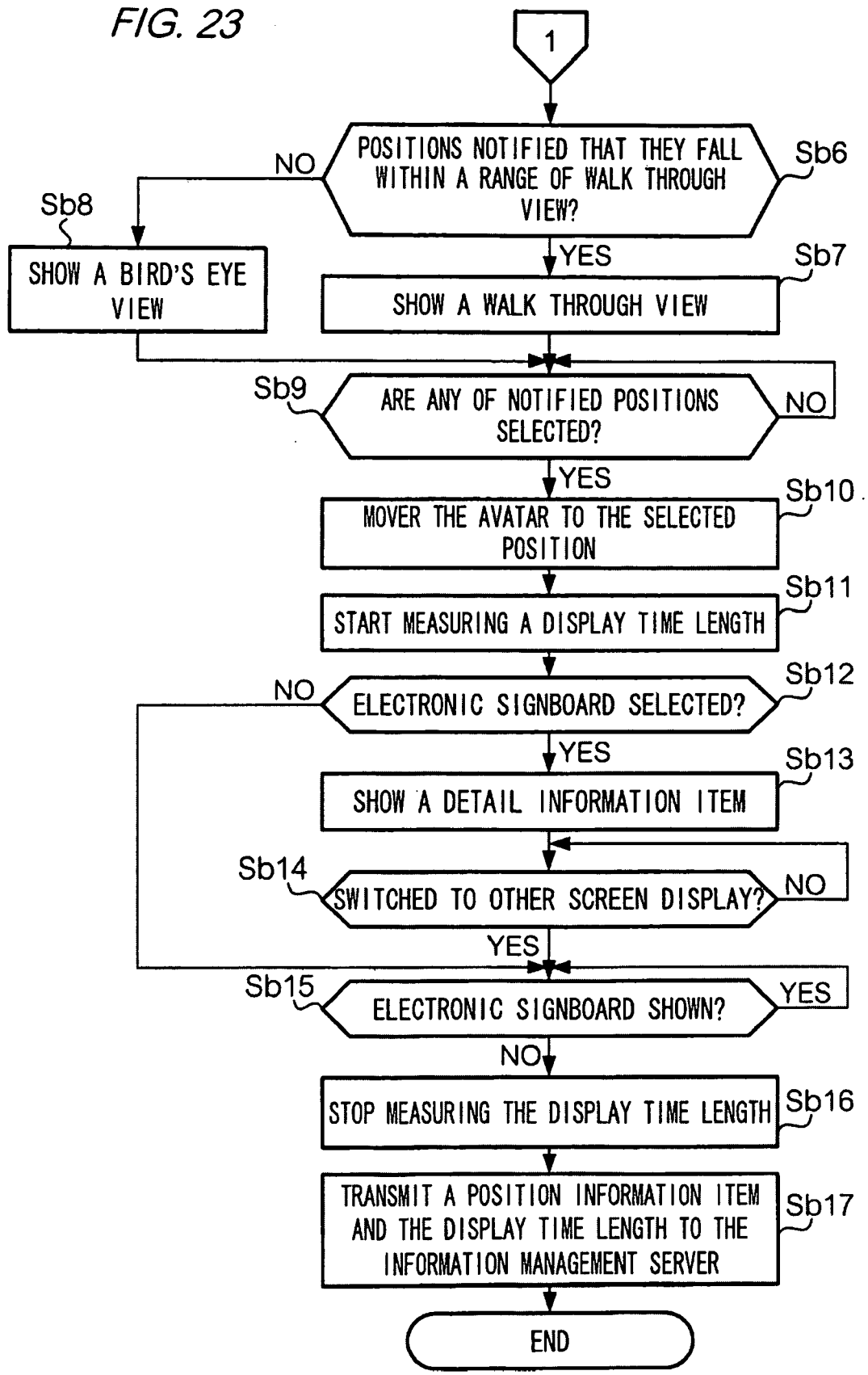
FIG. 23 is a flowchart showing processings executed by the controller of the mobile communication terminal.

The mobile communication terminal 50 receives the notification as described above, and displays a search result. The user refers to the search result, and can then browse announcement information items relevant to the input search word. FIG. 23 shows a flowchart showing processings executed by the controller 51 of the mobile communication terminal 50, in order to allow the user to achieve the operation as described above. The following description will be made with reference to the flowchart. Processings shown in the flowchart of the figure are carried out by the mobile communication terminal 50, following the processings shown in the flowchart of FIG. 20.

After positions of announcement information items are notified, the controller 51 of the mobile communication terminal 50 determines whether or not all of the positions are within a predetermined range from the position of the avatar at this time point (step Sb6). In other words, this determination is made to determine whether the notified positions can be displayed in a walk through view. That is, the aforementioned "predetermined range" means a displayable range which can be displayed in a walk through view.

If all of the positions can be displayed in a walk through view (step Sb6: YES), the controller 51 shows the search result in a walk through view (step Sb7). At this time, the controller 51 causes electronic signboards at the notified positions to be shown in a different display style from the other electronic signboards. For example, the controller 51 controls the electronic signboards at the notified positions to flicker or controls predetermined pictures and/or symbols to show up at the electronic signboards at the notified positions. Otherwise, if the positions notified of include any position which cannot be shown in the walk through view (step Sb6: NO), the controller 51 switches the walk through view to a display view capable of showing a broader area than the walk through view (step Sb8). A screen image displayed at this time is, for example, a bird's-eye view showing a part of the virtual space.

Figure 24:
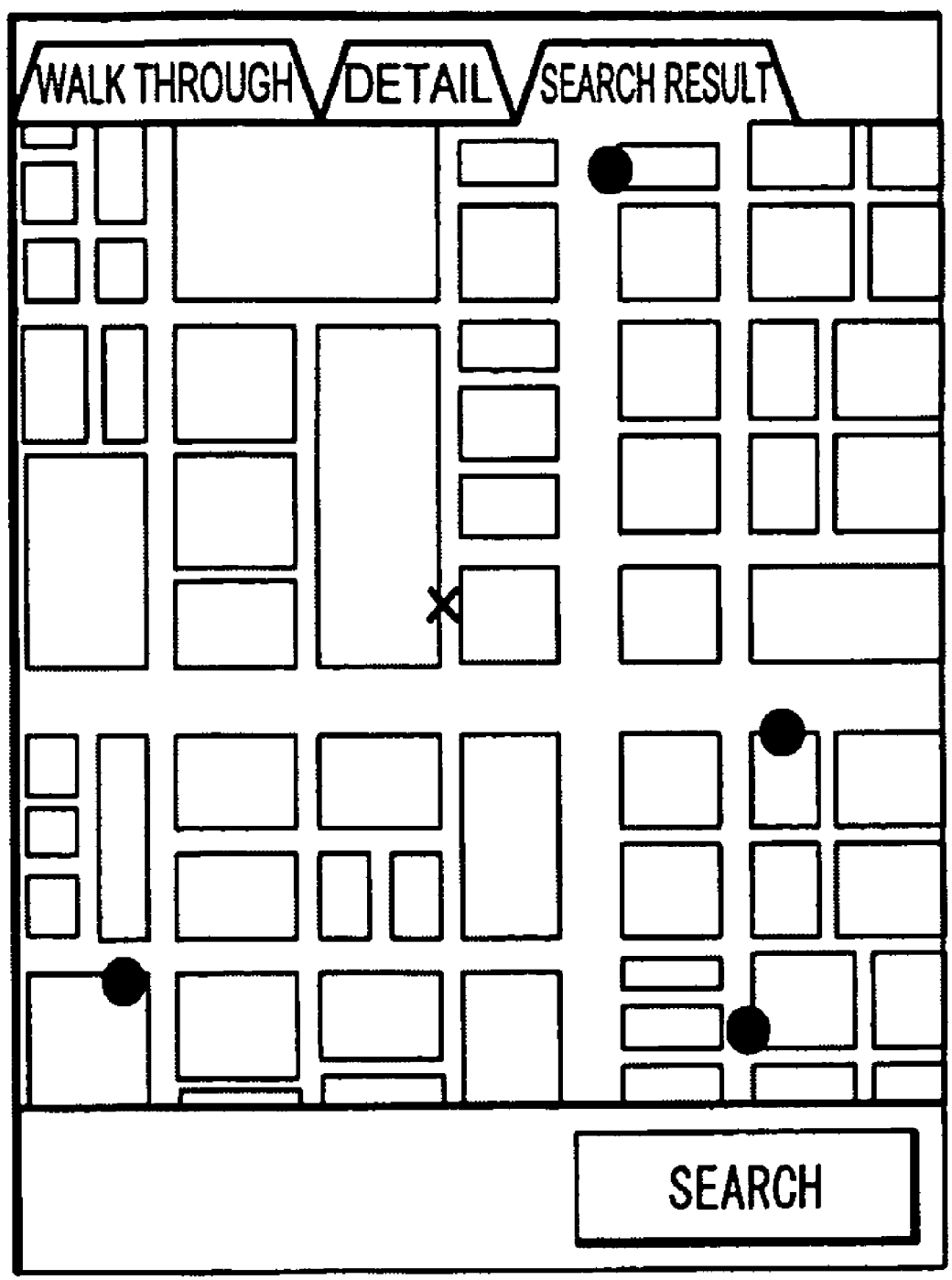
FIG. 24 shows an example of another screen image displayed on the display of the mobile communication terminal.

FIG. 24 shows an example of a case where positions which are notified by the information management server 40 are displayed in a bird's-eye view. In the figure, a position denoted at a mark "x" indicates the position of the avatar, and positions denoted at marks with dots indicate the positions notified by the information management server 40.

The description will now return to FIG. 23. After showing the positions notified by the information management server 40 in any of methods described above, the controller 51 waits until the user selects any of the positions. That is, the controller 51 repeatedly determines whether or not the enter button Bf has been selected with any of the marks selected, wherein the marks indicate the positions notified by the information management server 40 (step Sb9).

If any of the positions is selected by the user (step Sb9: YES), the controller 51 moves the position of the avatar representing the user to the selected position (step Sb10). At this time, the controller 51 controls the walk through view so that the electronic signboard associated with the selected position is displayed facing the front. Performing such screen display, the controller 51 starts measuring a display time length of an advertisement information item associated with the electronic signboard (step Sb11).

Thereafter, the controller 51 determines whether or not the user has further selected the electronic signboard displayed as described above (step Sb12). If the electronic signboard is selected (step Sb12: YES), the controller 51 performs control to show a detail information item associated with the electronic signboard (step Sb13). A screen image displayed at this time is similar to those described with reference to FIGS. 18 and 19. That is, the user can switch the screen display between the image of the detail information item and a walk through view by using tabs.

After showing the detail information item, the controller 51 repeatedly determines whether or not the screen display has been switched (step Sb14). Until the screen display is switched, the controller 51 recognizes that the user is browsing the detail information item, and continues adding up of the display time length being measured. If the screen display has been switched (step Sb14: YES), the controller 51 then repeatedly determines whether or not the electronic signboard which had been displayed previously is now displayed (step Sb15). While the electronic signboard is still now displayed, the controller 51 continues adding up of the display time length being measured, recognizing that the user is still browsing the electronic signboard. When the avatar thereafter moves or the like and the electronic signboard disappears (step Sb15), the controller 51 stops measuring the display time length (step Sb16).

Even if the detail information item is not browsed, the display time length is measured so long as the electronic signboard associated with the detail information item is displayed. That is, if no electronic signboard is selected in the step Sb12, the controller 51 repeatedly determines whether or not the electronic signboard is displayed (step Sb15). Until the electronic signboard disappears after the avatar moves or the like, the controller 51 continues adding up of the display time length. After stopping measuring the display time length (step Sb16), the controller 51 transmits, to the information management server 40, an information item (e.g., a position information item) indicating the position selected by the user from the search result, and a display time length of the announcement information item associated with the position (step Sb17).

Figure 25:
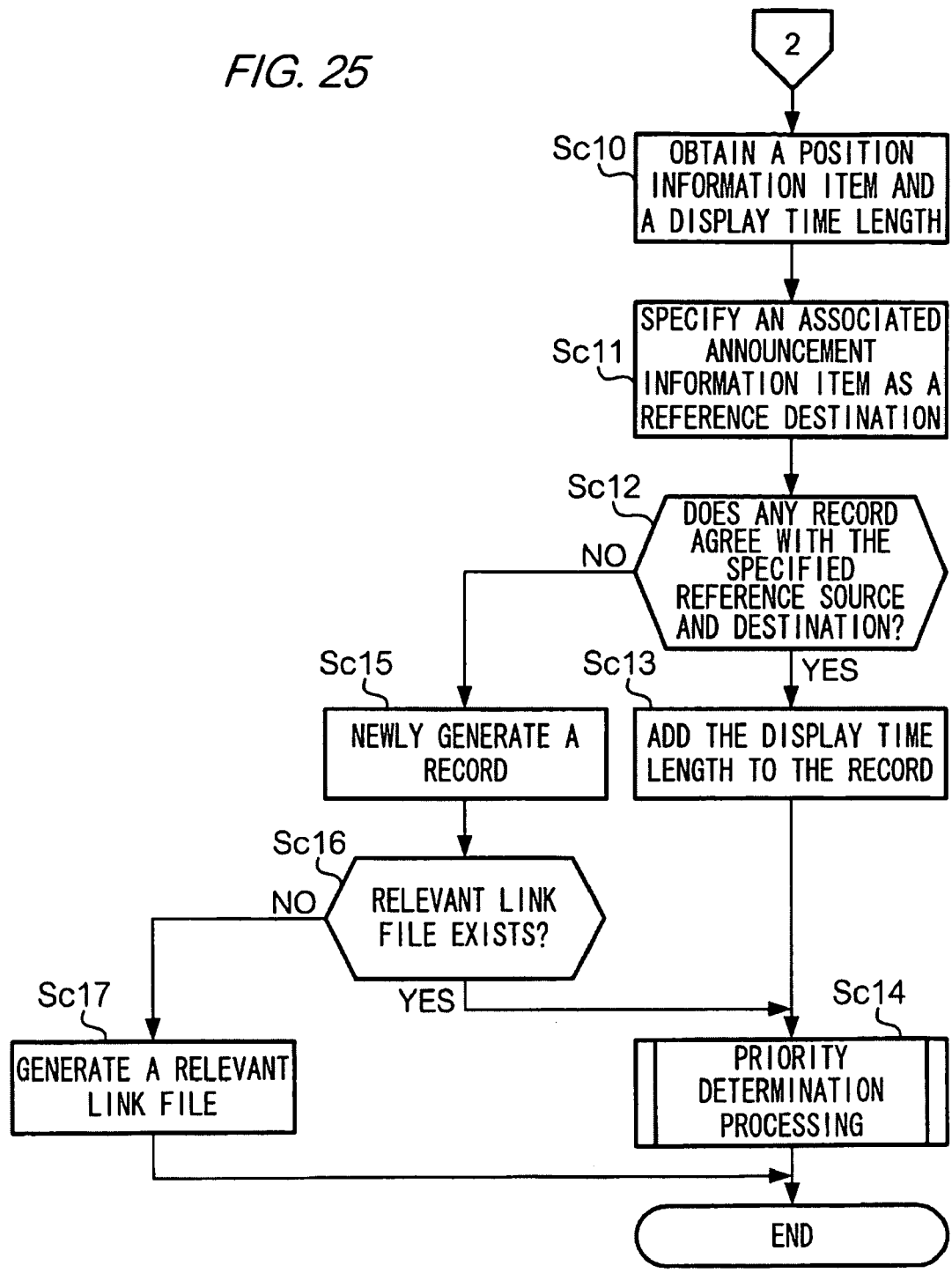
FIG. 25 is a flowchart showing processings executed by a controller of the information management server.

After the mobile communication terminal 50 transmits the position information item and the display time length as described above, the information management server 40 generates or updates a relevant link file. FIG. 25 is a flowchart showing processings performed by the controller 41 of the information management server 40 to generate or update a relevant link file. The following description will be made with reference to the figure. The processings shown in the flowchart are carried out by the information management server 40, subsequent to the processings shown in the flowchart of FIG. 22.

At first, the controller 41 of the information management server 40 obtains a position information item and a display time length which are transmitted by the mobile communication terminal 50 (step Sc10). Next, the controller 41 refers to the announcement information management table, and specifies an announcement information item associated with the obtained position information item (step Sc11). In this case, the announcement information item associated with the obtained position information item is an announcement information item indicated by a record in which the value in the field "Position information" corresponds to the obtained position information item.

Subsequently, the controller 41 refers to the link management table, and determines whether or not there is a record which contains as a reference source the announcement information item specified by the step Sc3 or Sc4 and also contains as a reference destination the announcement information item specified in the step Sc11 (step Sc12). URIs of detail information items associated with the announcement information items can be specified by referring to the field "Address information" on the announcement information management table.

If there is no such record (step Sc12: NO), the controller 41 regards as a reference source the announcement information item specified in the step Sc3 or Sc4, and newly generates a record which contains as a reference destination the announcement information item specified in the step Sc11 (step Sc15). In the generated record, the display time length obtained in the step Sc10 is directly used as a value in the field "Display time".

In this case of newly generating a record, the controller 41 determines whether or not there is a relevant link file associated with the announcement information item as the reference source of the generated record (step Sc16). If there is no relevant link file associated (step Sc16: NO), the controller 41 newly generates a relevant link file (step Sc17). The relevant link file generated at this time contains only one link indicating the reference destination described in the record generated in the step Sc15. Otherwise, if there is a relevant link file associated (step Sc16: YES), the controller 41 executes a priority determination processing which will be described later (step Sc14).

If there is a record as described above in the step Sc12 (step Sc12: YES), the controller 41 adds the display time length obtained in the step Sc10 to the value in the "Display time" in the record (step Sc13). Also in this case, the controller 41 executes the priority determination processing (step Sc14).

The priority determination processing will now be described. The priority determination processing is to determine priorities of links described in a relevant link file. If a relevant link file includes plural links as reference destinations, the controller 41 determines which of the plural links should be displayed with a priority. This determination is made depending on how the user of the mobile communication terminal 50 has browsed (showed up) announcement information items as respective reference destinations.

FIG. 26 is a flowchart showing a priority determination processing executed by the controller 41 of the information management server 40. As shown in the flowchart, the controller 41 first refers to the link management table, and extracts one or plural records each including a reference source which agrees with the advertisement information item specified in the step Sc11 (step Sc141). Subsequently, the controller 41 determines whether or not plural records have been extracted (step Sc142). If one single record has been extracted (step Sc142: NO), no comparative target exists, and the controller 41 therefore terminates the present processing without updating the relevant link file.

Otherwise, if plural records have been extracted (step Sc142: YES), the controller 41 refers to the value in the field "Display time" for each of the extracted records (step Sc143). The controller 41 then determines priorities for reference destinations of the plural records, respectively depending on the display time lengths written in the field "Display time" of the records (step Sc144). In this embodiment, the controller 41 determines priorities so that the greater the value in the "Display time" is (i.e., the longer the display time length is), the higher the priority for the reference destination is.

After determining priorities, the controller 41 updates the relevant link file, based on the priorities (step Sc145). Specifically, the controller 41 rewrites the relevant link file so that the higher priority a link to a reference destination is given, the higher the link is ranked. For example, where a list shown in FIG. 6 is taken as an example, the relevant link file shows that the link on the first line (DEF movie theater), the link on the second line (Cinema GHI), and the link on the third line (Full of new MOVIE information!) are compared with each other, the link on the first line is given the highest priority while the link on the third line is given the lowest priority.

According to the information management server 40 of this embodiment as has been described above, if a user of a mobile communication terminal 50 carries out a search based on an announcement information item (temporarily referred to as "announcement information item A") and then continuously browses another announcement information item (temporarily referred to as "announcement information item B"), a relevant link file describing association between these announcement information items is generated. Accordingly, when another user of another mobile communication terminal 50 browses the announcement information item A, a link to the announcement information item B can be shown in the detail information item of the announcement information item A. As a result, users can readily browse relevant information items in series, so that users can obtain desired information with less labor.

Also according to the information management server 40 of this embodiment, the order of displayed links which are described in a relevant link file varies depending on display time lengths of reference destinations which indicate how long the user of each mobile communication terminal 50 has allowed the reference destinations to be shown. Normally, an information item which has been browsed by numerous users for a very long time is, highly possibly, useful information. Therefore, by showing links in a manner as described above, an information item which is more likely to be useful can be accessed more easily. As a result, desired information can be easily found even in a situation that a countless number of various information items exist.

Modifications

The invention has been described above with reference to an exemplary embodiment. The invention, however, is not limited to the exemplary embodiment described above but can be practiced in other various modes. According to the invention, for example, modifications as follows can be made to the above embodiment.

The above embodiment shows an example of a configuration in which priorities of links are determined depending on display time lengths of announcement information items as reference destinations. However, priorities of links may alternatively be determined based on any other indices. For example, when determining a priority of a link, use frequency of an announcement information item at a reference destination has been used may be taken into consideration. An example of an index indicating use frequency may be a display count indicating how many times an electronic signboard or a detail information item has been displayed. A display time length of an announcement information item at a reference destination can be said to be also an index indicating use frequency, as well.

For example, in order to determine priorities of links depending on display counts of detail information items, the information management server 40 may accumulate records of display actions in which detail information items are actually displayed by the mobile communication terminals 50. As an example of actually achieving this configuration, the information management server 40 may be configured to store a table TB4 as shown in FIG. 27. The table shown in this figure is prepared by replacing the field "Display time" in the link management table shown in FIG. 9 with a field "Display count" indicating a display count as to how many times a reference destination has been displayed. In this case, each of the mobile communication terminals 50 may be configured to notify the information management server 40 of an information item (such as a URI), which identifies a detail information item displayed by the mobile communication terminal 50, in place of a display time length. By accumulating such information items, the same effects as achieved by the above embodiment can be achieved.

As an alternative example, download counts each indicating how many times a particular content item included in a detail information item has been downloaded may be used in place of display counts of detail information items as described above. In this case, the particular content item is desirably an electronic coupon representing some special service. Of course, the particular content item may alternatively be predetermined audio data or a program.

The above embodiment has exemplified a configuration that the information providing terminals 30 store detail information items. However, the information management server 40 may store detail information items. In this configuration, information (such as text data) included in a detail information item may be used as a keyword to be associated with a search word. Otherwise, data which equivalently serves as a keyword may be embedded in content such as image data or a program, in a format readable by the information management server 40. In addition, in case of the foregoing configuration that the information management server 40 stores detail information items, relevant link files need not be separate files from detail information items but may be part of detail information items.

In the other foregoing configuration that the information providing terminals 30 store detail information items, the information management server 40 may output relevant link files to the information providing terminals 30. In the information providing terminals 30, users may rewrite detail information items so as to include relevant link files as parts of the relevant link files. Otherwise, such rewriting may be automatically carried out by the information providing terminals 30.

Also, the above embodiment has exemplified a configuration in which the screen display is switched by tabs. The invention is not limited to this configuration. For example, the configuration may be modified so that each of a window for a walk through view and a window for a detail information item can be switched to the other. Otherwise, if the display 54 has a certainly large display area, both the windows for a walk through view and a detail information item may be displayed simultaneously.

Also, the above embodiment has exemplified a three-dimensional space as an example of a virtual space. Of course, the virtual space may alternatively be a two-dimensional space. The virtual space expressed by a map file may imitate an actually existing location or a fictional place.

Also, the above embodiment has exemplified a method of changing the display order of links as a method of displaying links depending on priorities. However, links may be displayed by any method other than the foregoing method. For example, a link to a reference destination given a high priority may be displayed conspicuously in a manner that the link to a reference destination given a high priority is set in a different display style from a display style of the other links. An example of setting a different display style is to increase a font size or to set a different font color.

In the above embodiment advertisement providing terminals 30 are computer devices and mobile communication terminals 50 are mobile phones. However, the invention is not limited to these terminals. For example, the advertisement providing terminals 30 may be mobile phones, and the mobile communication terminals 50 may be portable computer devices such as PDAs (Personal Digital Assistances). Further, the advertisement providing terminals 30 may have a configuration capable of executing a virtual space viewer.

In the above embodiment, not only announcement information items including keywords which agree with a search word but also announcement information items including keywords relevant to the search word are extracted as announcement information items which serve as reference destinations (see FIG. 22). However, only announcement information items including keywords which agree with a search word may be extracted. Alternatively, different weight coefficients may be defined respectively for the announcement information items including keywords which agree with a search word and for the announcement information items including keywords which are relevant to the search word. Display time lengths may be multiplied by the weight coefficients. In this configuration, if there is an announcement information item including a keyword which perfectly agrees with a search word, a link designating this announcement information item as a reference destination may be given a higher priority.

Also in the above embodiment, the step Sb17 utilizes a position information item as an information item for identifying an announcement information item selected from a search result. The information item to be transmitted at this time may be any information insofar as the information uniquely identifies the announcement information item. In this case, a URI of a detail information item associated with the announcement information item may be used as the information item which identifies the announcement information item.

Further, hardware and/or software structures of bulletin board servers, an information management server, and mobile communication terminals according to the invention are not limited to the structures shown in FIGS. 2, 5, 10, and 12. So long as the functions of the invention as described previously are performed, how the functions are practically constituted can be arbitrarily determined.

What is claimed is:

1. A server device comprising:
    a storage unit that stores keywords and predetermined positions in a virtual space, the keywords being associated with a plurality of announcement information items, and the plurality of announcement information items being respectively associated with the predetermined positions;
    a first obtaining unit that obtains a position indication information item and a search word from a client terminal, the position indication information item indicating one of a position of an avatar representing a user of the client terminal in the virtual space and a position in the virtual space associated with an announcement information item being referred to by the user via the client terminal, and the search word being used for searching for one or more announcement information items related to the search word;
    a specifying unit that specifies a position included in a predetermined range from the position indicated by the position indication information item obtained by the first obtaining unit, from among the plurality of the predetermined positions stored in the storage unit, thereby to specify an announcement information item associated with the specified position;
    an extraction unit that extracts one or more keywords relevant to the search word obtained by the first obtaining unit, from among the plurality of keywords stored in the storage unit, thereby to extract one or more of the plurality of announcement information items which are associated with the extracted one or more keywords, the predetermined positions with which the plurality of announcement information items are respectively associated not being variable by the extraction of one or more of the plurality of announcement information items, the one or more keywords extracted by the extracting unit including a term that is identical to the search word or has a meaning that is equal to or similar to the meaning of the search word;
    a notification unit that notifies the client terminal of one or more of the predetermined positions associated with the one or more of the plurality of announcement information items extracted by the extraction unit;
    a second obtaining unit that obtains an identification information item from the client terminal notified of the one or more of the predetermined positions by the notification unit, the identification information item being capable of identifying one of the plurality of announcement information items which is associated with one of the notified one or more of the predetermined positions;
    an association unit that associates a link information item with the announcement information item specified by the specifying unit, the link information item linking to the announcement information item identified by the identification information item obtained by the second obtaining unit; and
    an output unit that outputs the link information item associated by the association unit.

2. The server device according to claim 1, further comprising:
    a time obtaining unit that obtains a time information item indicating a display time length on the client terminal for each of the plurality of announcement information items, and
    a determination unit that determines, if an announcement information item is associated with a plurality of link information items, a display priority for each of the plurality of link information items, based on the time information item obtained by the time obtaining unit, wherein
    the determination unit determines the priority so that a higher priority is given to a link information item linking to one of the plurality of link information items for which the display time length obtained by the time obtaining unit is longer.

3. The server device according to claim 1, further comprising:
    a history storage unit that stores a history information item indicating frequency/length of use for each of the plurality of announcement information items stored in the storage unit, the history information item indicating how frequently or for how long each of the plurality of announcement information items stored in the storage unit has been used; and
    a determination unit that determines, if an announcement information item is associated with a plurality of link information items, a display priority for each of the plurality of link information items, based on the history information item stored in the history storage unit, wherein
    the determination unit determines the priority so that a higher priority is given to a link information item linking to one of the plurality of link information items for which the history information item stored in the history storage unit indicates higher frequency of use.

4. The server device according to claim 1, wherein
the storage unit stores site location information items indicating site locations of the plurality of announcement information items, with the site location information items associated with the keywords and the predetermined positions,
the extraction unit extracts the one or more of the plurality of announcement information items, based on the site location information items stored in the storage unit, and
the specifying unit specifies the announcement information item, based on the site location information items stored in the storage unit.

5. The server device according to claim 1, wherein the storage unit stores the plurality of announcement information items.

6. A non-transitory computer readable storage medium recording a program causing a computer to execute a process, the computer including a storage unit that stores keywords and predetermined positions in a virtual space, the keywords being associated with a plurality of announcement information items, the plurality of announcement information items being respectively associated with the predetermined positions, and the process comprising;

obtaining a position indication information item and a search word from a client terminal, the position indication information item indicating one of a position of an avatar representing a user of the client terminal in the virtual space and a position in the virtual space associated with an announcement information item being referred to by the user via the client terminal, and the search word being used for searching for one or more announcement information items related to the search word;

specifying a position included in a predetermined range from the position indicated by the obtained position indication information item, from among the plurality of the predetermined positions stored in the storage unit, thereby to specify an announcement information item associated with the specified position;

extracting keywords relevant to the obtained search word, from among the plurality of keywords stored in the storage unit, thereby to extract one or more of the plurality of announcement information items which are associated with the extracted keywords, the predetermined positions with which the plurality of announcement information items are respectively associated not being variable by the extraction of one or more of the plurality of announcement information items, the one or more keywords extracted including a term that is relevant to the search word;

notifying the client terminal of one or more of the predetermined positions associated with the extracted one or more of the plurality of announcement information items;

obtaining an identification information item from the client terminal notified of the one or more of the predetermined positions, the identification information item being capable of identifying one of the plurality of announcement information items which is associated with one of the notified one or more of the predetermined positions;

associating a link information item with the specified announcement information item, the link information item linking to the announcement information item identified by the obtained identification information item; and outputting the associated link information item.

* * * * *